(12) United States Patent
Kyung et al.

(10) Patent No.: US 11,508,199 B2
(45) Date of Patent: Nov. 22, 2022

(54) CONTROL METHOD BASED ON USER AUTHENTICATION USING DETECTION SENSOR AND DEVICE USING THEREOF

(71) Applicant: MOCA SYSTEM INC., Seongnam-si (KR)

(72) Inventors: Jae Hyun Kyung, Seongnam-si (KR); Jung Bin Yi, Suwon-si (KR); Jong Min Jeon, Suwon-si (KR)

(73) Assignee: MOCA SYSTEM INC., Seongnam-si (KR)

( * ) Notice: Subject to any disclaimer, the term of this patent is extended or adjusted under 35 U.S.C. 154(b) by 0 days.

(21) Appl. No.: 17/411,742

(22) Filed: Aug. 25, 2021

(65) Prior Publication Data

US 2022/0068064 A1 Mar. 3, 2022

(30) Foreign Application Priority Data

Aug. 25, 2020 (KR) .................. 10-2020-0107374
Aug. 23, 2021 (KR) .................. 10-2021-0111298

(51) Int. Cl.
*G07C 9/22* (2020.01)
*G07C 9/27* (2020.01)
(Continued)

(52) U.S. Cl.
CPC ........... *G07C 9/22* (2020.01); *G07C 9/00309* (2013.01); *G07C 9/27* (2020.01); *G07C 9/28* (2020.01); *G07C 2209/63* (2013.01)

(58) Field of Classification Search
CPC ... G07C 9/22; G07C 9/27; G07C 9/28; G07C 9/00309; G07C 2209/63
See application file for complete search history.

(56) References Cited

U.S. PATENT DOCUMENTS

2014/0049361 A1* 2/2014 Ahearn .................. G07C 9/28
340/5.7
2015/0227923 A1 8/2015 Kutsch
(Continued)

FOREIGN PATENT DOCUMENTS

CN 109712301 A 5/2019
CN 210924713 U 7/2020

OTHER PUBLICATIONS

EP Search Report in Application No. 21192906.2 dated Nov. 22, 2021.
(Continued)

*Primary Examiner* — Nabil H Syed
(74) *Attorney, Agent, or Firm* — Maschoff Brennan

(57) ABSTRACT

Disclosed is a control method of a control device, the control method including determining whether a movable object is located in a first area using a detection sensor, activating a first mode among operation modes of the control device when it is determined that the movable object is located in the first area, acquiring user confirmation information from a terminal when the first mode is activated wherein the user confirmation information corresponds to user-specific information stored in the terminal and is provided to the terminal by a server before the terminal provides the user confirmation information to the control device, transmitting processing request information based on the user confirmation information to the server so that the server performs processing on the user confirmation information, acquiring a processing result for the user confirmation information from the server, and providing the processing result for the user confirmation information to the terminal.

16 Claims, 11 Drawing Sheets

(51) Int. Cl.
  *G07C 9/28* (2020.01)
  *G07C 9/00* (2020.01)

(56) References Cited

U.S. PATENT DOCUMENTS

| | | | |
|---|---|---|---|
| 2015/0379795 A1* | 12/2015 | Wu | G07C 9/00309 |
| | | | 340/5.61 |
| 2017/0061410 A1 | 3/2017 | Dutta et al. | |
| 2018/0144563 A1* | 5/2018 | Reymann | E06B 11/02 |
| 2018/0293523 A1 | 10/2018 | Bergdale | |
| 2020/0128395 A1 | 4/2020 | Mars et al. | |
| 2021/0383624 A1* | 12/2021 | Hoyer | G07C 9/00309 |

OTHER PUBLICATIONS

Notice for Reasons of Rejection dated Sep. 13, 2022 as received in Japanese application No. 2021-137045.

* cited by examiner

CONTROL METHOD BASED ON USER AUTHENTICATION USING DETECTION SENSOR AND DEVICE USING THEREOF

CROSS-REFERENCE TO RELATED APPLICATION

This application claims priority to and the benefit of Korean Patent Application No. 10-2020-0107374, filed on Aug. 25, 2020 and Korean Patent Application No. 10-2021-0111298, filed on Aug. 23, 2021, the disclosure of which is incorporated herein by reference in its entirety.

BACKGROUND

1. Field of the Invention

The present invention relates to a user authentication-based control method using a detection sensor and a device using the same.

2. Discussion of Related Art

In the field of performing user authentication to manage access to a building or a specific area, payment processing, use of a specific device, and the like, a technique for improving convenience by utilizing a user terminal is used. In this technology, a user terminal has been implemented as a card key in the related art but has recently been gradually expanded to a mobile terminal such as a smartphone that a user carries.

However, it may take a lot of time for a mobile terminal to acquire information necessary for user authentication compared to a conventional card key, and accordingly, there occurs an inconvenience in that a user feels delayed.

In addition, in the case of conventional BLE communication, the required communication time varies depending on the operating system of a mobile terminal, or there is a problem of taking more time than expected to transmit and receive data.

SUMMARY OF THE INVENTION

The present disclosure is directed to providing a control method capable of enhancing the accuracy and security of user authentication regardless of terminal performance.

The present disclosure is also directed to providing a control method capable of shortening the time taken for user authentication and processing corresponding to user authentication.

Technical solutions of the present disclosure are not limited to the aforementioned solutions, and other solutions that are not described herein will be clearly understood by those skilled in the art from the following description and the accompanying drawings.

According to an aspect of the present disclosure, there is provided a control method of a control device, the control method including determining whether a movable object is located in a first area using a detection sensor, activating a first mode among operation modes of the control device when it is determined that the movable object is located in the first area, acquiring user confirmation information from a terminal when the first mode is activated wherein the user confirmation information corresponds to user-specific information stored in the terminal and is provided to the terminal by a server before the terminal provides the user confirmation information to the control device, transmitting processing request information based on the user confirmation information to the server so that the server performs processing on the user confirmation information, acquiring a processing result for the user confirmation information from the server, and providing the processing result for the user confirmation information to the terminal.

Also, wherein the operation mode of the control device is set to a second mode when it is not determined that the movable object is located in the first area.

Also, wherein the first mode comprises an active mode in which the control device is allowed to communicate with a terminal present in the first area, and wherein the second mode comprises an inactive mode in which the control device is not allowed to communicate with a terminal present in the first area.

Also, wherein when the first mode is activated, the control device communicates with a terminal present in the first area and a terminal present in a second area indicating a predetermined communication area other than the first area, and wherein when the second mode is activated, the control device communicates with a terminal present in the second area without communicating with a terminal in the first area.

Also, wherein the control device comprises a first communication unit configured to communicate with a terminal present in the first area and a second communication unit configured to communicate with a terminal present in the second area, and wherein the control unit performs control to drive the first communication unit and the second communication unit when the first mode is activated, and wherein the control unit performs control to drive the second communication unit without driving the first communication unit when the second mode is activated.

Also, wherein the user-specific information comprises at least one of identification information of the terminal, identification information of a user of the terminal, or information necessary for user authentication.

Also, wherein the first mode comprises a central mode in which the control device receives an advertising signal from the terminal and scans the terminal in response to receiving the advertising signal, and wherein the second mode comprises a peripheral mode in which the control device transmits an advertising signal to the terminal and is scanned by the terminal in response to transmitting the advertising signal.

Also, wherein the first communication unit operates in a central mode in which the control device receives an advertising signal from the terminal and scans the terminal in response to receiving the advertising signal, and wherein the second communication unit operates in a peripheral mode in which the control device transmits an advertising signal to the terminal and is scanned by the terminal in response to transmitting the advertising signal.

Also, wherein the determining whether a movable object is located in a first area using a detection sensor comprises acquiring a detection signal from the detection sensor when the movable object is located in the first area and determining that the movable object is located in the first area when the detection signal is acquired.

Also, wherein the user confirmation information comprises a result for user authentication that is performed by the server based on the user-specific information, and wherein the processing request information based on the user confirmation information comprises a processing request for a result of the user authentication.

Also, wherein the user confirmation information comprises information for confirming that the terminal is in the first area, wherein the processing request information based on the user confirmation information comprises a user authentication request that requests the server to perform user authentication based on the user confirmation information, and wherein the processing result for the user confirmation information comprises a result of the user authentication.

According to another aspect of the present disclosure, there is provided a control method of a terminal, the control method including providing user-specific information of the terminal to a server, acquiring user confirmation information based on the user-specific information from the server, providing the user confirmation information to a control device, wherein the user confirmation information is received by the control device when the terminal is located in a first area and the control device confirms that a movable object is located in the first area through a detection sensor placed inside or near the control device, and acquiring a processing result for the user confirmation information from the control device when processing request information based on the user confirmation information is provided from the control device to the server so that processing of the user confirmation information is performed by the server.

Also, wherein the providing of user-specific information of the terminal to a server comprises transmitting the user-specific information of the terminal from the control device to the server in a second area indicating a predetermined communication area other than the first area.

Also, wherein the providing of user-specific information of the terminal to a server comprises transmitting the user-specific information of the terminal to the control device so that the user-specific information of the terminal is transmitted to the server.

Also, wherein the providing of user-specific information of the terminal to a server comprises determining whether the terminal is located in the second area and providing the user-specific information of the terminal to the server when it is determined that the terminal is located in the second area.

Also, wherein the transmitting of the user-specific information of the terminal to the server comprises confirming a location of the terminal using at least one of a signal received from the control device, a signal received from an external device, or a signal acquired from a global positioning system (GPS) sensor included in the terminal and determining whether the terminal is located in the second area on the basis of the confirmed location of the terminal.

Technical solutions of the present disclosure are not limited to the aforementioned solutions, and other solutions that are not described herein will be clearly understood by those skilled in the art from the following description and the accompanying drawings.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
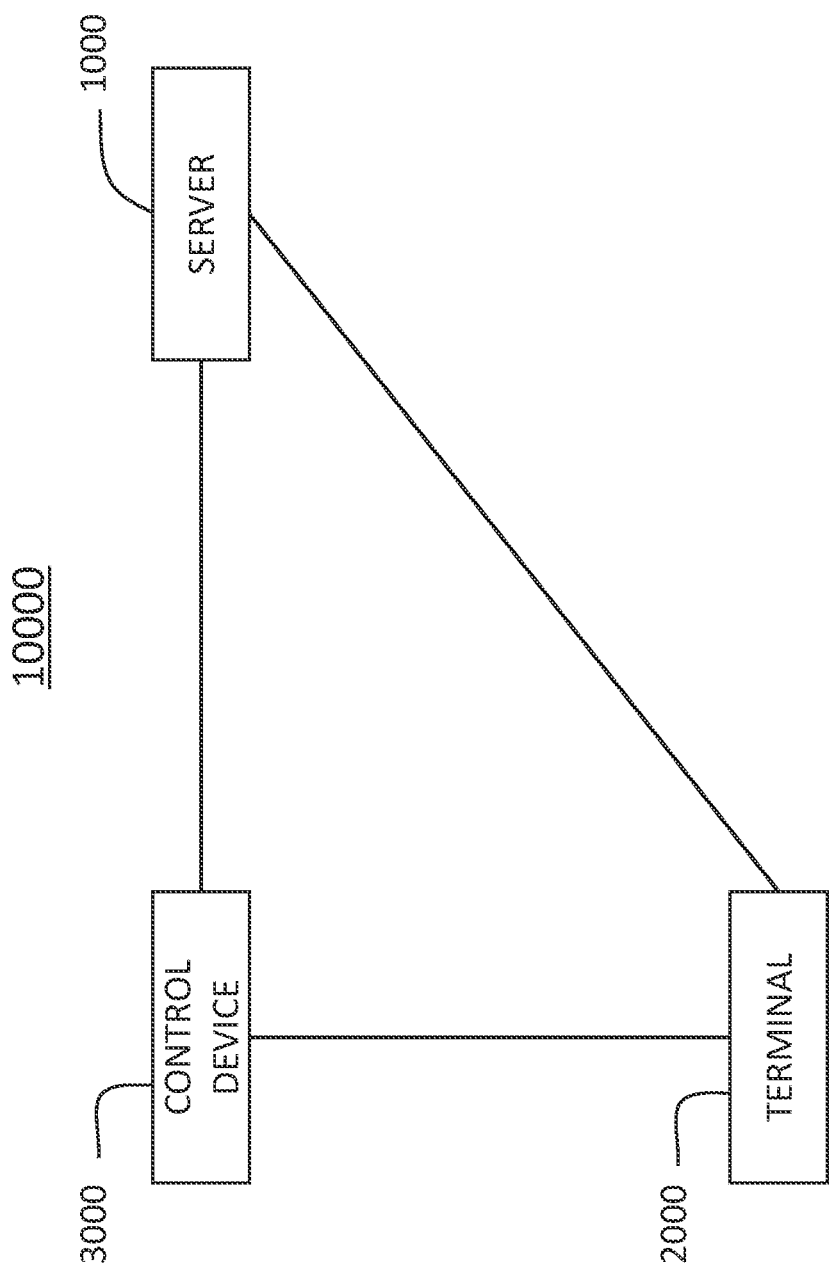
FIG. 1 is a block diagram of a management system according to an embodiment.

Embodiments described in the present disclosure have been made to clearly explain the concept of the present disclosure to those having ordinary skill in the art, and thus the present disclosure is not limited to the embodiments described in the present disclosure. The scope of the present disclosure should be interpreted as including variations and modifications within the spirit of the present disclosure.

The terms used in the present disclosure are selected from general terms, which are currently widely used, on the basis of functions in the present disclosure, and may vary according to the intentions of those of ordinary skill in the art, precedents in the related art, or the advance of new technology. When a specific term is defined and used with an arbitrary meaning, the meaning of the term will be described separately. Accordingly, the terms used in the present disclosure should be interpreted on the basis of the real meanings of the terms and the entire description of the present disclosure, rather than the simple names of such terms.

The accompanying drawings in the present disclosure are for facilitating the description of the present disclosure. The shape illustrated in the drawings may be exaggerated for the purpose of convenience of explanation, so the present disclosure is not limited to the drawings.

In the present disclosure, a detailed description of related known functions or configurations incorporated herein will be omitted as necessary when it makes the subject matter of the disclosure rather unclear.

An access management method and an access management device using the same according to an embodiment of the present disclosure will be described below.

FIG. 1 is a block diagram of a management system according to an embodiment.

Referring to FIG. 1, a management system 10000 may include a server 1000, a terminal 2000, and a control device 3000.

The server 1000 may communicate with at least one of the control device 3000 or the terminal 2000 to transmit or receive various pieces of information.

According to an embodiment, the server 1000 may provide information necessary for user authentication to at least one of the control device 3000 or the terminal 2000. Here, user authentication may refer to authentication as to whether a user or a user terminal has specific authority. For example, the user authentication may include authentication for various privileges such as access authority authentication as to whether a user or a user terminal has authority to access a specific area; payment authority authentication as to whether a user or a user terminal has authority to perform payment processing; use authority authentication as to whether a user or a user terminal has an authority to use a specific device, and operation mode setting authentication as to whether a user or a user terminal has authority to set an operation mode of a specific device. Also, the server 1000 may perform the user authentication and provide a result of the authentication to at least one of the control device 3000 or the terminal 2000. Also, when the user authentication is performed by at least one of the control device 3000 or the terminal 2000, the server 1000 may acquire a result of the user authentication from at least one of the control device 3000 or the terminal 2000.

Also, the server 1000 may perform processing corresponding to the user authentication. For example, when the server 1000 receives a processing request for user authentication from the terminal 2000 or the control device 3000, the server 1000 may perform processing corresponding to the user request or determine whether the processing corresponding to the user request is to be performed by the terminal 2000 or the control device 3000 and may provide a result of the determination to the terminal 2000 or the control device 3000. Here, the processing for user authentication may refer to a subsequent operation to be performed based on the user authentication, such as controlling a user's access to a specific area, controlling a user's payment processing, controlling a user's use of a specific device, or controlling the operation mode of a specific device depending on the user authentication result.

Also, the terminal 2000 may communicate with at least one of the control device 3000 or the server 1000 to transmit or receive various pieces of information. For example, the terminal 2000 may transmit or receive information necessary for user authentication from or to the control device 3000. Also, the terminal 2000 may transmit data necessary for an access request and/or a setting change request to the control device 3000 or the server 1000. Also, in some embodiments, the terminal 2000 may perform the above-described user authentication.

Also, when user authentication is performed, the terminal 2000 may make a processing request for the user authentication from the control device 3000 or the server 1000 and acquire a result of the processing request from the control device 3000 or the server 1000. Also, the terminal 2000 may acquire a result of whether the processing for user authentication can be performed from the control device 3000 or the server 1000 and perform the processing for user authentication on the basis of the result.

Also, an application for performing some embodiments to be described below may be provided to the terminal 2000.

Also, the terminal 2000 may be implemented with a smartphone, a tablet, a personal digital assistant (PDA), a notebook, a wearable device, etc. Alternatively, the terminal 2000 may be implemented with a smart card, an integrated circuit (IC) card, a magnetic card, a radio frequency (RF) chip, or the like, which is capable of recording data.

The control device 3000 may communicate with at least one of the server 1000 or the terminal 2000 to transmit or receive various pieces of information. Also, the control device 3000 may perform the above-described various processes corresponding to the user authentication result. For example, the control device 3000 may control a user's access to a specific area, control a user's payment processing, control a user's use of a specific device, or control the operation mode of a specific device depending on the user authentication result.

As a specific example, when a user's access to a specific area is restricted by a gate, the control device 3000 may control the gate to control the user's access to the specific area according to the user authentication result. Here, the gate is a device that physically restricts a user's access, and may include an access restriction device (e.g., an access bar, an access door, etc.). The control device 3000 may allow a user's access by providing an unlock signal to the gate according to the user authentication result to control the gate to open. Also, the control device 3000 may disallow a user's access by preventing an unlock signal from being provided to the gate or providing a lock signal to the gate to control the gate to be closed depending on the user authentication result. Also, in some embodiments, the control device 3000 may be placed inside or near the gate.

Also, when the control device 3000 controls payment processing, the control device 3000 may perform a payment approval procedure. For example, the control device 3000 may receive a payment request from the terminal 2000 and may approve or disapprove the payment request on the basis of the user authentication result. Also, in some embodiments, the payment approval procedure may be performed by the server 1000. In this case, the control device 3000 may deliver the payment request received from the terminal 2000 to the server 1000 and may receive a result of the payment approval from the server 1000. Also, the control device 3000 may perform various control operations on the basis of the payment approval result. For example, when the control device 3000 controls a gate for access to public transportation, the control device 3000 may control the gate on the basis of the payment approval result. Also, the control device 3000 may provide the payment approval result to at least one of the server 1000 or the terminal 2000. Also, when controlling the use of a specific device according to the user authentication result, the control device 3000 may control the use of the specific device through software installed in the specific device or control the use of the specific device by controlling a restriction device for physically restricting the use of the specific device on the basis of the user authentication result.

Also, when controlling the operation mode of the specific device, the control device 3000 may set the operation mode of the specific device on the basis of the user authentication result. For example, when the control device 3000 controls an access control device for managing access to a specific area, the control device 3000 may control the access control device in a security mode that increases a security level in the specific area or control the access control device in a normal mode in which the security mode is released on the basis of the user authentication result. Also, in some embodiments, the access control device may be included in the control device 3000.

The processing for user authentication may also be performed by the server 1000 or the terminal 2000.

Also, in some embodiments, the control device 3000 may perform an operation for the above-described user authentication. This will be described in detail below.

Also, when user authentication is performed, the control device 3000 may make a processing request for user authentication from the terminal 2000 or the server 1000 and acquire a result of the processing request from the terminal 2000 or the server 1000. Also, the control device 3000 may acquire a result of whether the user authentication can be processed from the terminal 2000 or the server 1000 and perform the processing for user authentication on the basis of the result.

However, the block diagram shown in FIG. 1 is just an example for convenience of description, and the present invention is not limited thereto. According to some embodiments, any element may be added to the block diagram of FIG. 1, and the elements shown in FIG. 1 may be excluded or subdivided.

Figure 2:
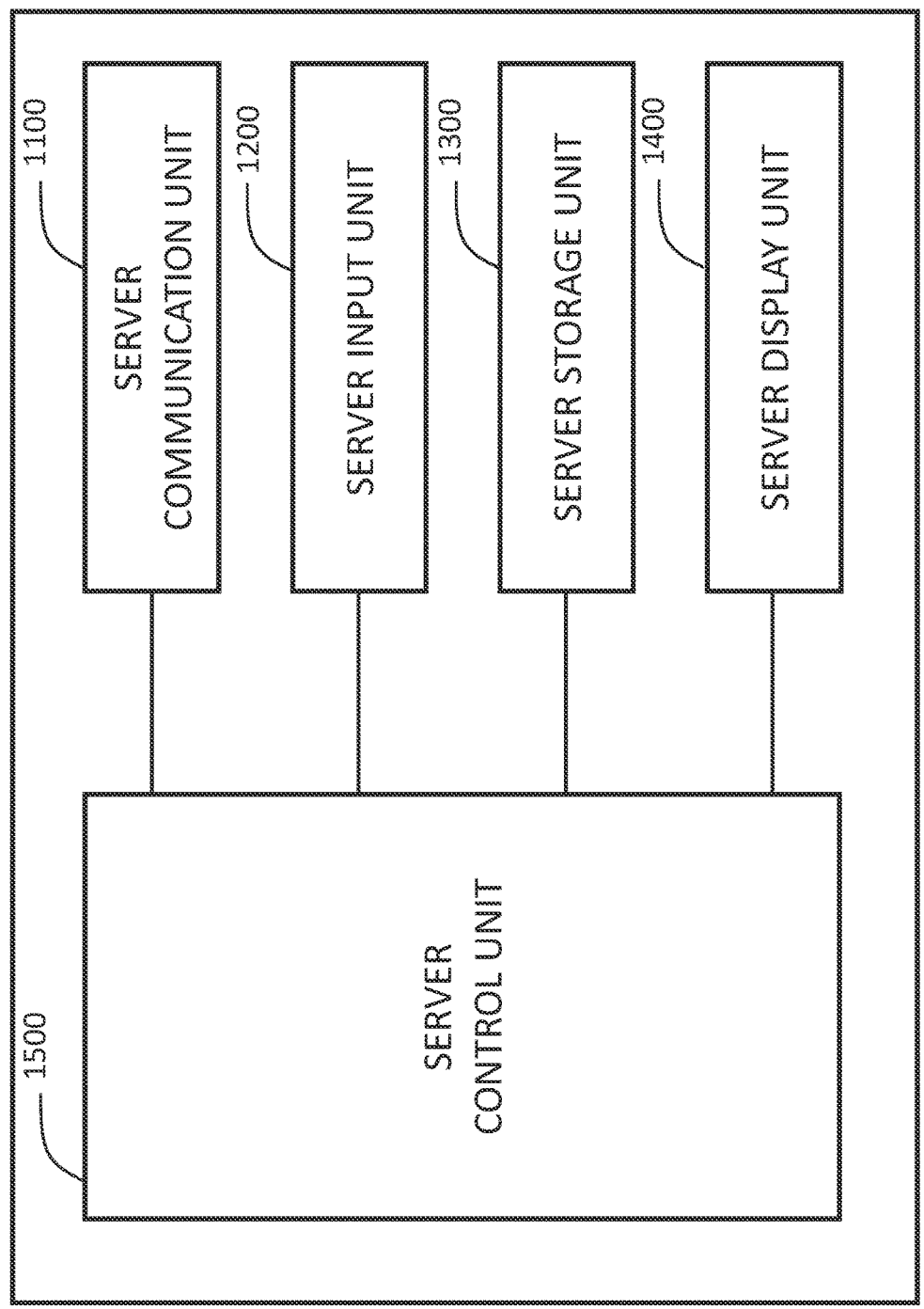
FIG. 2 is a block diagram of a server according to an embodiment.

FIG. 2 is a block diagram of a server according to an embodiment.

Referring to FIG. 2, the server 1000 may include a server communication unit 1100, a server input unit 1200, a server storage unit 1300, a server display unit 1400, and a server control unit 1500.

The server communication unit 1100 may communicate with at least one of the terminal 2000 or the control device 3000. As another example, the server communication unit 1100 may transmit biometric information to be stored in the control device 3000 to the terminal 2000.

Also, the server communication unit 1100 may include mobile communication modules such as Bluetooth low energy (BLE), Bluetooth, wireless local area network (WLAN), wireless fidelity (WiFi), WiFi Direct, near field communication (NFC), infrared data association (IrDA), ultra wide band (UWB), Zigbee, 3G, 4G, and 5G and other wired or wireless modules capable of transmitting data through various communication standards.

The server input unit 1200 may acquire an electrical signal corresponding to a user input. The server input unit 1200 may include a keypad, a keyboard, a switch, a button, and a touchscreen.

The server storage unit 1300 may store various kinds of data. For example, the server storage unit 1300 may store information necessary for user authentication (e.g., user authorization information, user-specific information (or a user's or terminal's identification information and identification information necessary for payment processing (e.g., a user's card information, authentication information corresponding to card information, etc.), a user's biometric information, password information, etc.)) or information regarding a user authentication result.

Also, the server storage unit 1300 may store information acquired from the terminal 2000 or the control device 3000. Also, the server storage unit 1300 may store a program necessary for operation of the server 1000.

The server storage unit 1300 may include at least one type of storage medium selected from among a flash memory-type memory, a hard disk-type memory, a multimedia card micro-type memory, a card-type memory (e.g., an SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disc. Also, the memory may store information temporarily, permanently, or semi-permanently and may be provided as a built-in-type or removable-type memory.

Also, the server display unit 1400 may output visual information. For example, the server display unit 1400 may be a liquid crystal display (LCD), an organic light-emitting diode (OLED) display, an active-matrix organic light-emitting diode (AMOLED) display, etc.

Also, the server control unit 1500 may control each element of the server 1000 or may process and compute various kinds of information. Also, among steps that will be described in the following methods, the server control unit 1500 may control operations for carrying out some steps that are performed by the server 1000 or may perform computations necessary to carry out the steps.

The server control unit 1500 may be implemented with software, hardware, or a combination thereof. For example, with hardware, the server control unit 1500 may be implemented with a field-programmable gate array (FPGA), an application-specific integrated circuit (ASIC), a semiconductor chip, and various other types of electronic circuits. As another example, with software, the server control unit 1500 may be implemented with logic programs or various kinds of computer languages which are performed by the hardware.

The server 1000 does not necessarily have to include all of the above-described elements, and some of the elements may be selectively excluded. For example, when the server 1000 does not provide direct visual information, the server display unit 1400 may be excluded from the server 1000. Also, an element for performing an additional function and operation may be selectively added to the server 1000.

Figure 3:
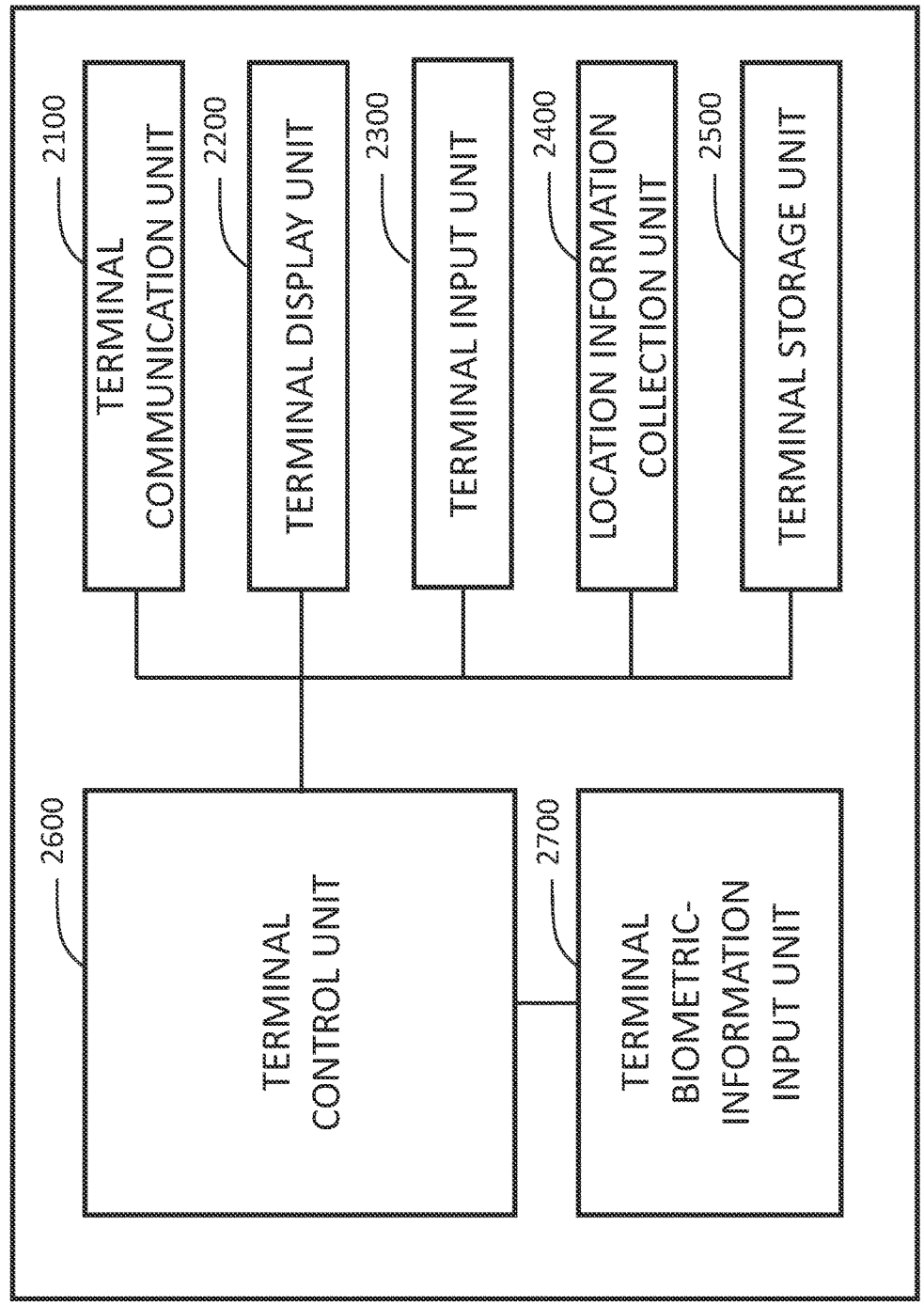
FIG. 3 is a block diagram of a terminal according to an embodiment.

FIG. 3 is a block diagram of a terminal according to an embodiment.

Referring to FIG. 3, the terminal 2000 may include a terminal communication unit 2100, a terminal display unit 2200, a terminal input unit 2300, a location information collection unit 2400, a terminal storage unit 2500, a terminal control unit 2600, and a terminal biometric-information input unit 2700.

The terminal communication unit 2100 may communicate with at least one of the server 1000 or the control device 3000. For example, the terminal communication unit 2100 may transmit or receive information necessary for user authentication or user authentication result information to or from at least one of the server 1000 or the control device 3000.

Also, the terminal communication unit 2100 may include mobile communication modules such as BLE, Bluetooth, WLAN, WiFi, WiFi Direct, NFC, IrDA, UWB, Zigbee, 3G, 4G, and 5G and other wired or wireless modules capable of transmitting data through various communication standards.

The terminal display unit 2200 may output various pieces of visual information. For example, the terminal display unit 2200 may output the information when the control device 3000 is detected through communication with the control device 3000 and communication is established. Also, the terminal display unit 2200 may visually output a user authentication result. Also, the terminal display unit 2200 may visually output a message received from the server 1000. Also, the terminal display unit 2200 may visually output a screen for inputting setting change information in order to change the settings of the control device 3000.

The terminal display unit 2200 may be an LCD display, an OLED display, an AMOLED display, or the like. When the terminal display unit 2200 is provided as a touchscreen, the terminal display unit 2200 may function as the terminal input unit 2300. In this case, a separate terminal input unit 2300 may not be selectively provided, and a terminal input unit 2300 configured to perform limited functions such as a volume control function, a power button function, and a home button function may be provided.

The terminal input unit 2300 may acquire a signal corresponding to a user input. For example, the terminal input unit 2300 may acquire an input for requesting user authentication from the server 1000 or the control device 3000. Also, the terminal input unit 2300 may acquire an input for acquiring information necessary for user authentication (e.g., user authorization information, user-specific information (or a user's or terminal's identification information, identification information necessary for payment processing (e.g., a user's card information, authentication information corresponding to card information, etc.), a user's biometric information, password information, etc.)). Also, the terminal input unit 2300 may receive setting change information to change the settings of the control device 3000.

Also, the terminal input unit 2300 may be implemented with, for example, a keyboard, a keypad, a button, a jog dial, or a wheel. Also, the user input may be, for example, a button press, a touch, or a drag. When the terminal display unit 2200 is implemented with a touchscreen, the terminal display unit 2200 may serve as the terminal input unit 2300.

The location information collection unit 2400 may acquire location information for the terminal 2000 to determine its location. For example, the location information collection unit 2400 may acquire coordinate information for determining a location, like a GPS sensor. As another example, the location information collection unit 2400 may determine the location of the terminal 2000 on the basis of a signal received from an external device. For example, when the terminal 2000 receives a signal indicating a specific area from the control device 3000, the terminal 2000 may confirm the specific area in response to receiving the signal.

Also, the terminal storage unit 2500 may store various kinds of data. For example, the terminal storage unit 2500 may store information necessary for operation of the terminal 2000 (e.g., information necessary for user authentication (e.g., user authorization information, user-specific information (or a user's or terminal's identification information, identification information necessary for payment processing (e.g., a user's card information, authentication information corresponding to card information, etc.), a user's biometric information, password information, etc.))).

The terminal storage unit 2500 may include at least one type of storage medium selected from among a flash memory-type memory, a hard disk-type memory, a multimedia card micro-type memory, a card-type memory (e.g., an SD or XD memory), a RAM, an SRAM, a ROM, an EEPROM, a PROM, a magnetic memory, a magnetic disk, and an optical disc. Also, the memory may store information temporarily, permanently, or semi-permanently and may be provided as a built-in-type or removable-type memory.

The terminal control unit 2600 may control each element of the terminal 2000 or may process and compute various kinds of information. Also, the terminal control unit 2600 may acquire signals from some elements included in the terminal 2000. Also, among steps that will be described in the following methods, the terminal control unit 2600 may control operations for carrying out some steps that are performed by the terminal 2000 or may perform computations necessary to carry out the steps.

The terminal control unit 2600 may be implemented with software, hardware, or a combination thereof. For example, with hardware, the terminal control unit 2600 may be implemented with an FPGA, an ASIC, a semiconductor chip, and various other types of electronic circuits. As another example, with software, the terminal control unit 2600 may be implemented with logic programs or various kinds of computer languages which are performed by the hardware.

The terminal biometric-information input unit 2700 may receive a user's biometric information. The biometric information may refer to at least one of the user's voice information, fingerprint information, iris information, face information, and vein information. The terminal biometric-information input unit 2700 may be implemented with at least one of a microphone through which the user's voice information is input, a screen scanner through which the user's fingerprint information is input, and a camera through which the user's iris information, face information, and vein information are input.

The terminal 2000 does not necessarily have to include all of the above-described elements, and some of the elements may be selectively excluded. For example, when the terminal 2000 does not receive biometric information, the terminal biometric-information input unit 2700 may be excluded from the terminal 2000. Also, an element for performing an additional function and operation may be selectively added to the terminal 2000.

Figure 4:
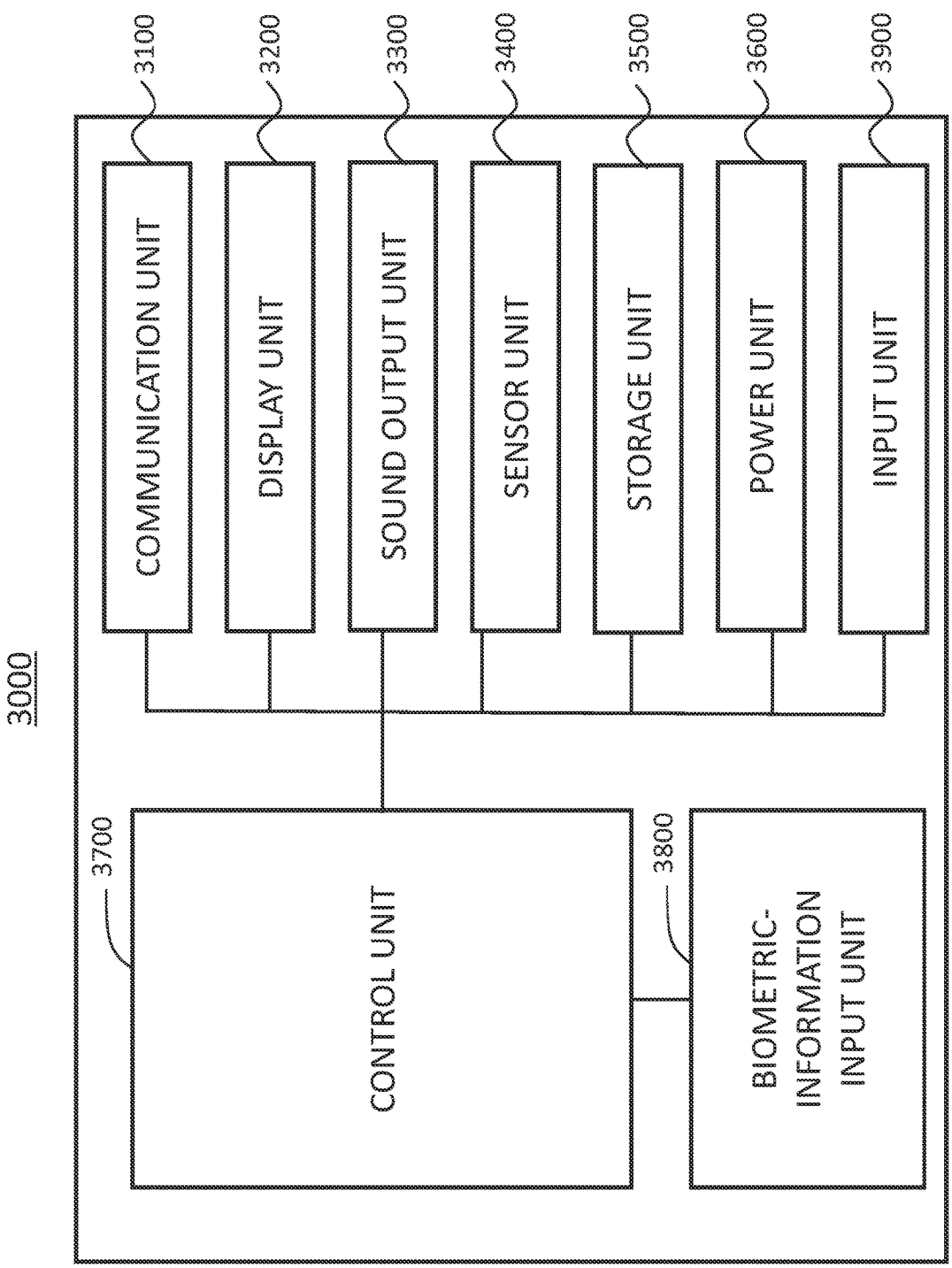
FIG. 4 is a block diagram of a control device according to an embodiment.

FIG. 4 is a block diagram of a control device according to an embodiment.

Referring to FIG. 4, the control device 3000 may include a communication unit 3100, a display unit 3200, a sound output unit 3300, a sensor unit 3400, a storage unit 3500, a power unit 3600, a control unit 3700, a biometric-information input unit 3800, and an input unit 3900.

The communication unit 3100 may communicate with at least one of the server 1000 or the terminal 2000. For example, the communication unit 3100 may transmit or receive information necessary for user authentication or user authentication result information to or from at least one of the server 1000 or the terminal 2000.

As another example, the communication unit 3100 may receive a setting change signal from the terminal 2000. Also, the communication unit 3100 may transmit result information obtained by performing a setting change to the terminal 2000.

The communication unit 3100 may mainly communicate according to wireless communication standards but may include mobile communication modules such as BLE, Bluetooth, WLAN, WiFi, WiFi Direct, NFC, IrDA, UWB, Zigbee, 3G, 4G, and 5G and other wired or wireless modules capable of transmitting data through various communication standards. Also, the communication unit 3100 may include a short-range wireless module that supports NFC, RFID, or the like.

In an embodiment, the communication unit 3100 may include a first communication unit (not shown) and a second communication unit (not shown).

In an embodiment, the first communication unit (not shown) and the second communication unit (not shown) may be configured to have different communication areas. For example, the first communication unit (not shown) may be configured to communicate with an area relatively close to the control device 3000 or the sensor unit 3400 (e.g., a first area described with reference to FIGS. 6 to 11), and the second communication unit (not shown) may be configured to communicate with an area relatively far from the control device 3000 or the sensor unit 3400 or the remaining area (e.g., a second area described with references to FIGS. 6 to 11) excluding the communication area of the first communication unit (not shown).

For example, the first communication unit (not shown) and the second communication unit (not shown) may be set to have different communication distances. As an example, the first communication unit (not shown) may be set to have a communication distance that is the same as or different from the sensing distance of the sensor unit 3400 by a predetermined distance or less, and the second communication unit (not shown) may be set to have a longer communication distance than the first communication unit (not shown). In this case, the second communication unit (not shown) may be set not to communicate over a communication distance in which the first communication unit (not shown) can communicate. For example, the second communication unit (not shown) may filter out a signal received in the communication distance in which the first communication unit (not shown) can communicate.

Also, the first communication unit (not shown) may operate in a central mode, which will be described below, and the second communication unit (not shown) may communicate in a peripheral mode. Thus, the first communication unit (not shown) may communicate with a terminal communicating in the peripheral mode, and the second communication unit (not shown) may communicate with a terminal operating in the central mode. As an example, when a terminal in a second area operates in the central mode, the second communication unit (not shown) may communicate with the terminal, and the first communication unit (not shown) may not communicate with the terminal. Also, when a terminal in the first area operates in the peripheral mode, the first communication unit (not shown) may communicate with the terminal, and the second communication unit (not shown) may not communicate with the terminal. In some cases, it will be appreciated that the first communication unit (not shown) may communicate in the peripheral mode and the second communication unit (not shown) may communicate in the central mode.

The display unit 3200 may output information to be visually provided to a user.

For example, when a door opening signal is received, the display unit 3200 may output visual information indicating the reception. Also, when a setting change signal is received, the display unit 3200 may output visual information indicating the reception.

The display unit 3200 may be an LCD display, an OLED display, an AMOLED display, or the like. When the display unit 3200 includes a touch panel, the display unit 3200 may operate as a touch-based input device.

The sound output unit 3300 may output information to be auditorily provided to a user. For example, when a door opening signal is received, the display unit 3200 may output auditory information indicating the reception. Also, when a setting change signal is received, the display unit 3200 may output auditory information indicating the reception.

The sound output unit 3300 may be a speaker, a buzzer, or the like, which outputs sound.

The sensor unit 3400 may acquire an external environment signal required for the control device 3000. For example, the sensor unit 3400 may check whether a movable object (e.g., a user) is present near the control device 3000. Also, the sensor unit 3400 may be placed inside or near the control device 3000. Also, in some embodiments, the sensor unit 3400 may not be included in the control device 3000. In this case, a separate sensor may be placed near the control device 3000.

The sensor unit 3400 may be implemented based on various configurations. For example, the sensor unit 3400 may be implemented based on various devices such as an infrared sensor, a camera, and a wireless communication device (e.g., a Bluetooth communication device). As an example, when the sensor unit 3400 includes an infrared sensor, an output signal of the sensor unit 3400 may be changed or output when a user passes through a gate. Based on the change or output of the output signal, the sensor unit 3400 may determine whether the user is located near the gate. As another example, when the sensor unit 3400 includes a camera, the sensor unit 3400 may track a user's movement on the basis of images acquired by the camera and may detect whether the user is located near the gate on the basis of the tracking result. As another example, when the sensor unit 3400 includes a wireless communication device, the wireless communication device and a user's terminal may communicate, and the sensor unit 3400 may detect whether the user is located near the gate on the basis of a received signal strength indication at the wireless communication device or the received signal strength indication at the terminal.

For example, according to an embodiment, the sensor unit 3400 may acquire a signal about a distance between a user and an object or the like. As another example, the sensor unit 3400 may acquire a signal necessary for the control device to determine a location.

Various kinds of information may be stored in the storage unit 3500. For example, the storage unit 3500 may store a program for performing a control operation of the control unit 3700 and may store data received from the outside, data generated by the control unit 3700, etc. Also, the storage unit 3500 may store information necessary for operation of the control device 3000 (e.g., information necessary for user authentication (e.g., user authorization information, user identification information (e.g., a user's or terminal's identification information, a user's biometric information, password information, etc.))) and user authentication result information.

The storage unit 3500 may include at least one type of storage medium selected from among a flash memory-type memory, a hard disk-type memory, a multimedia card micro-type memory, a card-type memory (e.g., an SD or XD memory), a RAM, an SRAM, a ROM, an EEPROM, a PROM, a magnetic memory, a magnetic disk, and an optical disc. Also, the memory may store information temporarily, permanently, or semi-permanently and may be provided as a built-in-type or removable-type memory.

The power unit 3600 may provide power necessary to lock or unlock the gate. Also, the power unit 3600 may provide power necessary to open or close the gate. The power unit 3600 may be provided as a motor, a solenoid, an actuator or the like.

When the power unit 3600 provides the power necessary to lock or unlock the gate, the power unit 3600 may provide power so that a locking unit (not shown) for locking or unlocking the gate is in a locked state or an unlocked state or changed to the locked state or the unlocked state. The locking unit may be provided as, for example, a deadbolt, a latch bolt, or a combination thereof. Also, the locking unit is not limited to the deadbolt and latch bolt, which have been described as an example, and typical locking units may be utilized.

In some embodiments, the power unit 3600 may or may not be included in the control device 3000. Also, the power unit 3600 may be placed near the control device 3000 in the form of a separate device. In this case, the control device 3000 may provide a signal for controlling the power unit 3600 to the power unit 3600. Also, the above-described locking unit may also be included in the control device 3000 and may be placed near the control device 3000 or controlled by the control device 3000.

The control unit 3700 may control each element of the control device 3000 or may process and compute various kinds of information. Also, the control unit 3700 may acquire signals from some elements included in the control device 3000. Also, among steps that will be described in the following methods, the control unit 3700 may control operations for carrying out some steps that are performed by the control device 3000 or may perform computations necessary to carry out the steps.

The control unit 3700 may be implemented with software, hardware, or a combination thereof. For example, with hardware, the control unit 3700 may be implemented with an FPGA, an ASIC, a semiconductor chip, and various other types of electronic circuits. As another example, with software, the control unit 3700 may be implemented with logic programs or various kinds of computer languages which are performed by the hardware.

The biometric-information input unit 3800 may receive a user's biometric information. For example, the biometric-information input unit 3800 may receive at least one of the user's voice information, fingerprint information, iris information, face information, and vein information. The biometric-information input unit 3800 may be implemented with at least one of a microphone through which the user's voice information is input, a screen scanner through which the user's fingerprint information is input, and a camera through which the user's iris information, face information, and vein information are input.

The input unit 3900 may be configured to receive various inputs. For example, the input unit 3900 may acquire an input for requesting user authentication from the server 1000 or the terminal 2000. Also, the input unit 3900 may acquire an input for acquiring information necessary for user authentication (e.g., a user's or a user terminal's identification information, password information, biometric information, etc.). Also, the input unit 3900 may receive setting change information to change the settings of the control device 3000.

Also, the input unit 3900 may receive a user authentication request from a user. For example, when the user authentication is authentication of a user's access to a specific area, the control device 3000 may receive an input for opening a door, drive the power unit 3600 to open the door, or allow an access authentication request signal to be transmitted to the server 1000 or the terminal 2000. For example, the control device 3000 may be implemented with a keyboard, a keypad, a button, a switch, a jog dial, or a wheel. Also, the user input may be, for example, a switch press, a button press, a touch, or a drag. When the display unit 3200 is implemented with a touchscreen, the display unit 3200 may serve as the input unit 3900.

The control device 3000 according to an embodiment of the present disclosure does not necessarily have to include all of the above elements, and some of the elements may be selectively excluded.

The management system 10000 according to an embodiment of the present disclosure may be implemented to include at least one control device 3000. As an example, the management system 10000 may include a control device 3000 including a communication unit 3100 and a control unit 3700. As a specific example, the control device 3000 may receive information acquired from the terminal 2000 through the communication unit 3100, which functions as a reader, may analyze the acquired information through the control unit 3700, which functions as a controller, and may perform a function of controlling operations such as access management, time and attendance management, and a system mode change.

Also, an element for performing an additional function and operation may be selectively provided to the control device 3000.

Figure 5:
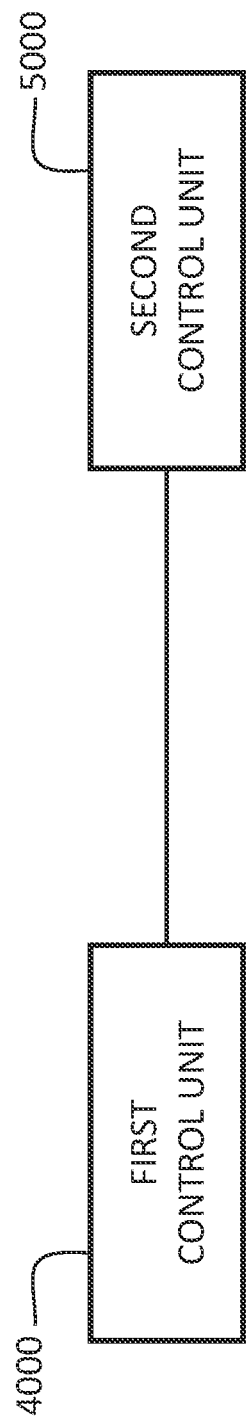
FIG. 5 is a diagram illustrating a control device according to an embodiment.

FIG. 5 is a diagram illustrating a control device according to an embodiment.

Referring to FIG. 5, in some embodiments, the control device 3000 may include a plurality of devices. For example, the control device 3000 may include a first control device 4000 and a second control device 5000.

As a specific example, the first control device 4000 may serve to communicate with an external device, and the second control device 5000 may serve to control the first control device 4000. As an example, the first control device 4000 may receive information acquired from at least one of the server 1000 or the terminal 2000 through a communication unit functioning as a reader and may transmit the acquired information to the second control device 5000 through a communication unit connected to the second control device 5000 in a wired or wireless communication manner. In this case, when the second control device 5000 receives the information from the first control device 4000, the second control device 5000 may perform a function of controlling operations such as access management, time and attendance management, and a system mode change on the basis of the information received through the control unit.

In addition, as another example, the first control device 4000 may include the first communication unit that has been described above, the second control device 5000 may include the second communication unit that has been described above, and vice versa.

Also, as another example, the first control device 4000 and the second control device 5000 may perform the same function. For example, when there are two gates, the first control device 4000 may be placed at the first gate, and the second control device 5000 may be placed at the second gate. An operation for user authentication may be performed at the gates where the first control device 4000 and the second control device 5000 are placed.

Also, as another example, the first control device 4000 and the second control device 5000 may include respective communication units, and communication standards supported by the communication units may be different. As an example, the second control device 5000 may support a communication scheme not supported by the first control device 4000 as well as a communication scheme supported by the first control device 4000. For example, when the first control device 4000 and the second control device 5000 are in the form of readers, the second control device 5000 may support the communication scheme not supported by the first control device 4000. Thus, the first control device 4000 may be expressed as a legacy reader, and the second control device 5000 may be expressed as a sub-reader.

As a specific example, the communication unit of the first control device 4000 may support a short-range wireless communication standard such as NFC and RFID, and the communication unit of the second control device 5000 may support a wireless communication standard such as BLE or Bluetooth. In this case, when the communication unit 2100 of the terminal 2000 supports BLE communication, the first control device 4000 and the terminal 2000 may not be able to communicate with each other. At this time, when the wireless communication standards supported by the second control device 5000 and the terminal 2000 match each other, the second control device 5000 may receive data from the terminal 2000 and transmit the received data to the first control device 4000. For example, the second control device 5000 may receive BLE format data that is used in the BLE from the terminal 2000, convert the BLE format data into RFID format data that is used in the RFID and that is understandable by the first control device 4000, and transmit the converted data to the first control device 4000. Similarly in the opposite case, after the second control device 5000 receives the RFID format data from the first control device 4000, the second control device 5000 may convert the RFID format data into BLE format data and transmit the converted data to the terminal 2000. That is, the second control device 5000 serves to help the first control device 4000 communicate with the terminal 2000 in a communication scheme not supported by the first control device 4000.

The management system 10000 associated with various embodiments and the elements, operations, terms, and the like included in the management system 10000 have been described above. The above-described management system 10000 and the elements, operations, terms, and the like included in the management system 10000 may be applied to various methods and embodiments which will be described below. However, it should be noted that the following management system 10000 does not necessarily have to be configured to have the above-described elements and functions and may be applied even to a management system having a different configuration from the above-described management system 10000.

Figure 6:
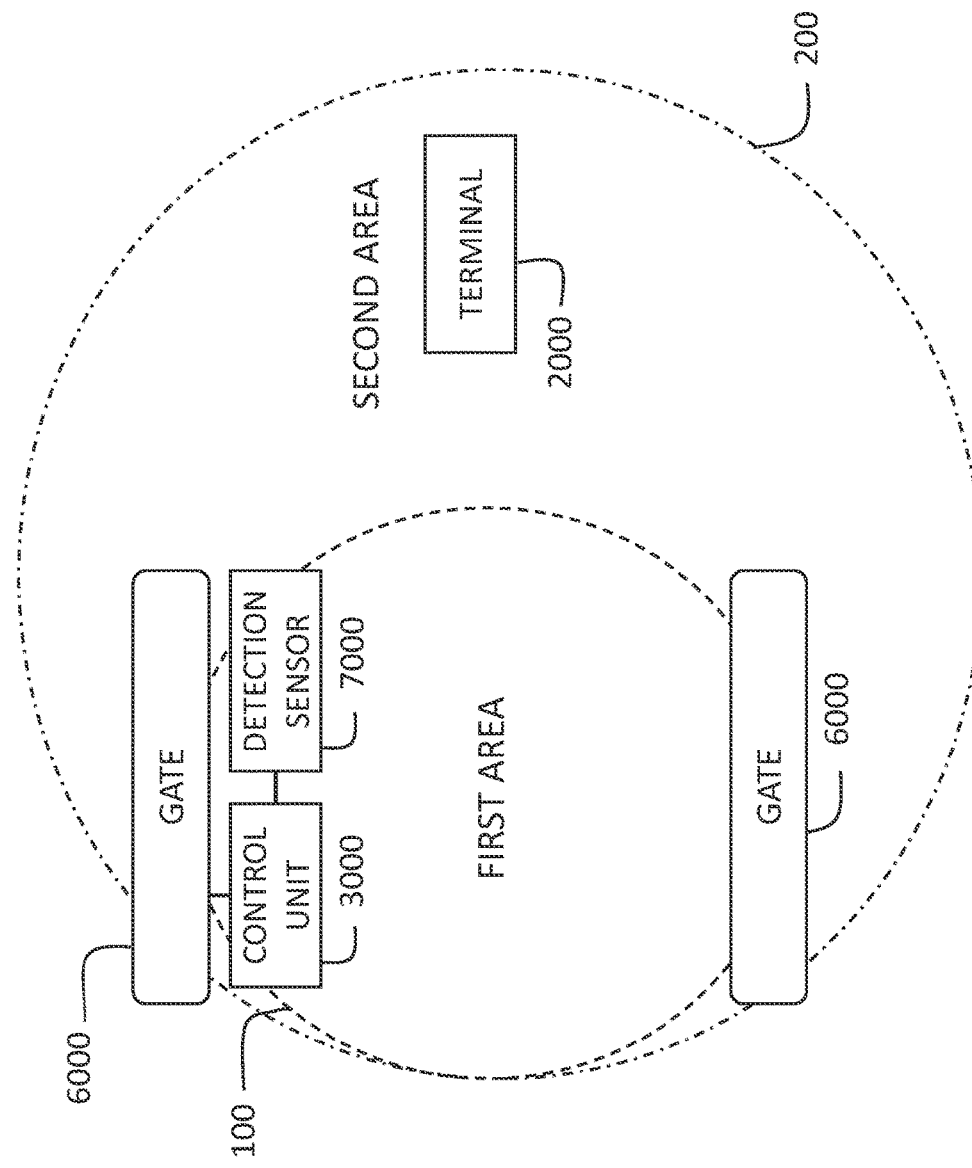
FIG. 6 is a diagram illustrating an environment in which a control method of a control device is implemented according to an embodiment.

FIG. 6 is a diagram illustrating an environment in which a control method of a control device is implemented according to an embodiment.

Referring to FIG. 6, the control device 3000 may be placed inside or near the gate 6000. The control device 3000 may control the gate according to a user authentication result and/or processing corresponding to a user authentication result. For example, when the gate 6000 is used to control access to the inside of the gate, the control device 3000 may control the opening or closing of the gate 6000 so that a user can enter through the gate 6000 or exit through the gate 6000 on the basis of the user authentication result. Also, in order to enter and exit through the gate 6000, when payment for product purchase, public transportation boarding, etc. are accompanied, the control device 3000 may control the gate 6000 on the basis of a payment processing result corresponding to user authentication.

As a specific embodiment, the control device 3000 may acquire information necessary for user authentication from the terminal 2000, perform user authentication based on the acquired information, or transmit the acquired information to a server (not shown) so that user authentication is performed in the server. Also, when the control device 3000 acquires a user authentication result, the control device 3000 may perform processing corresponding to the user authentication result or may transmit a processing request corresponding to the user authentication result to the server 1000.

For example, when the control device 3000 communicates with the terminal 2000 using a wireless communication scheme and the terminal 2000 is located in the first area 100, the control device 3000 may determine that a user of the terminal 2000 intends to perform user authentication, acquire information necessary for user authentication from the terminal 2000, or perform the user authentication or provide the information necessary for user authentication to a server (not shown). Also, when user authentication has been previously performed and the terminal 2000 is located in the first area 100, the control device 3000 may determine that the user of the terminal 2000 intends to perform user authentication according to the user authentication result, acquire a processing request corresponding to the user authentication result from the terminal 2000, and/or provide the processing request corresponding to the user authentication result to the server 1000.

For example, the control device 3000 may determine whether the terminal 2000 is located in the first area 100 using the received signal strength indication (e.g., RSSI) of a signal received from the terminal 2000. However, the accuracy of positioning of the terminal 2000 may be low when using only the received signal strength indication of the received signal. Accordingly, when the terminal 2000 is not accurately positioned, user authentication may be performed on a user of the terminal 2000 or processing corresponding to a user authentication result may be performed even when the terminal 2000 is not located in the first area 100 but is located in the second area 200, which is farther from the gate 6000 than the first area 100, or is outside the first area 100 and the second area 200. Accordingly, an error such as the gate 6000 being erroneously opened may occur.

In order to prevent such an error, the control device 3000 may accurately determine whether the user of the terminal 2000 is located in the first area 100 using a detection sensor 7000 and may perform an operation for performing user authentication or processing corresponding to a user authentication result when the user of the terminal 2000 is determined to be located in the first area 100. In some embodiments, the detection sensor 7000 may be located inside or near the control device 3000 or the gate 6000. Also, the detection sensor 7000 may refer to the above-described sensor unit 3400. When the detection sensor 7000 is placed near the control device 3000 or the gate 6000, the detection sensor 7000 and the control device 3000 may perform wired communication in a wired manner or perform wireless communication in various communication schemes.

Figure 7:
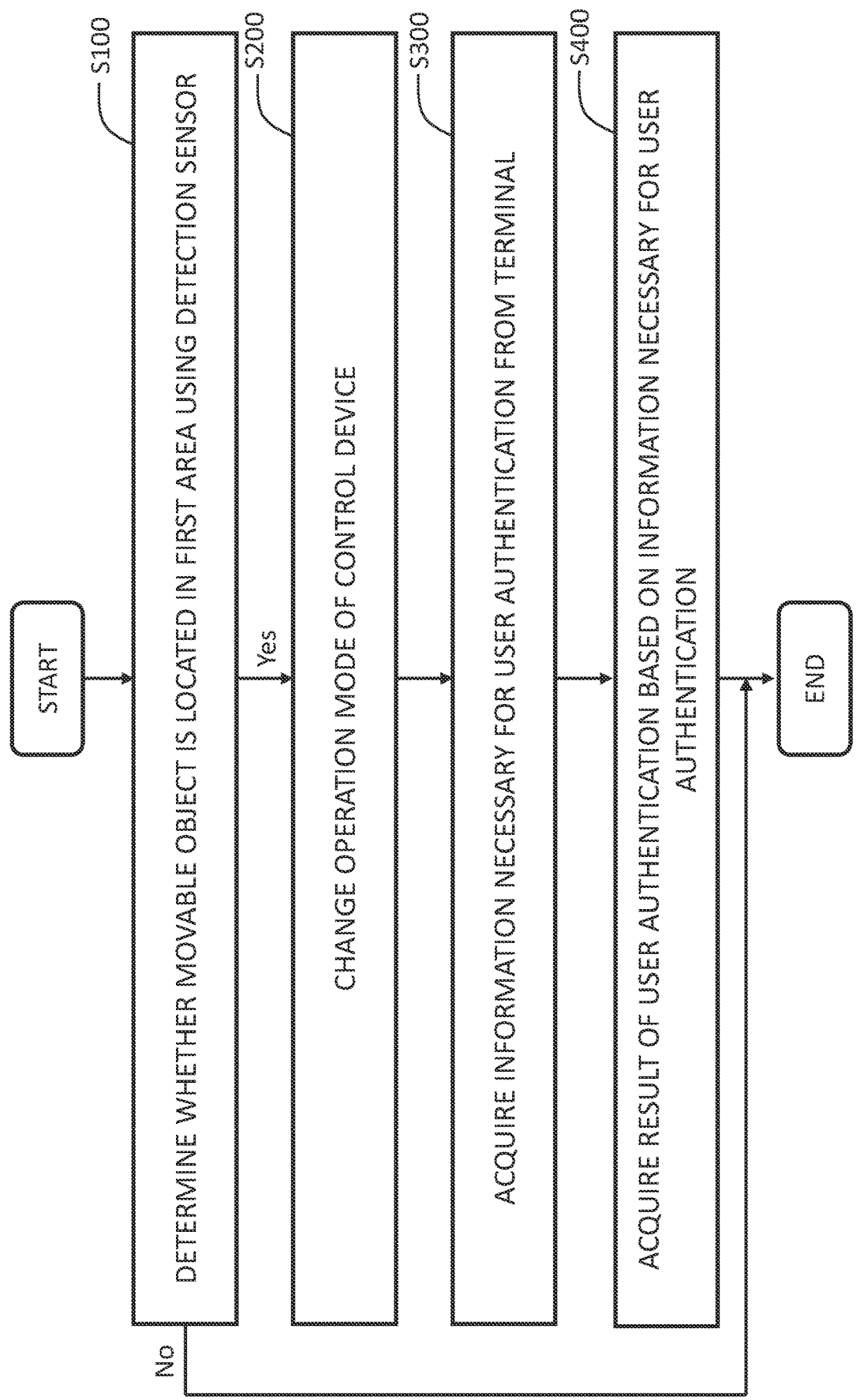
FIG. 7 is a flowchart illustrating a control method of a control device according to an embodiment.

FIG. 7 is a flowchart illustrating a control method of a control device according to an embodiment.

Referring to FIG. 7, the control method of the control device may include determining whether a movable object is located in a first area using a detection sensor (S100), changing an operation mode of the control device when it is determined that the movable object is located in the first area (S200), acquiring information necessary for user authentication from a terminal (S300), and acquiring a result of the user authentication on the basis of the information necessary for user authentication (S400).

In operation S100, the control device may acquire a detection signal from the detection sensor. Here, the detection sensor may be placed inside or near the control device. The description of the sensor unit 3400 of the above-described control device and the description with reference to FIG. 6 may be applied to the detection sensor, and thus a detailed description thereof will be omitted.

In an embodiment, the detection sensor may transmit a detection signal to the control device when a movable object is located within the detection range. When a detection signal is received from the detection sensor, the control device may determine that a movable object is located within the detection range of the detection sensor.

As an example, the detection range of the detection sensor may be shorter than a wireless communication distance between a user's terminal and the control device. For example, the detection range of the detection sensor may be shorter than a Bluetooth or BLE communication range between a user's terminal and the control device. This is because the user approaches the control device when he or she intends to perform user authentication or to perform processing corresponding to user authentication in the control device, and thus the possibility that he or she is located in the detection range of the detection sensor may be high. On the other hand, when the user does not intend to perform user authentication or to perform processing corresponding to user authentication, he or she may be separated from the control device, and thus the possibility that he or she is located in the detection range of the detection sensor may be low even though he or she is located at a location where the control device and his or her terminal can communicate with each other.

For convenience of description, hereinafter, the detection range of the detection sensor is referred to as a first area, and an area other than the first area is referred to as a second area. However, in some cases, the second area may refer to an area where the control device and a user's terminal can perform wireless communication.

Also, in operation S200, the control device may change the operation mode according to whether a movable object is located in the first area. That is, the operation mode of the control device when there is a movable object in the first area may be different from the operation mode of the control device when no movable object is in the first area.

In an embodiment, when a movable object is located in the first area, the communication mode of the control device may be changed. Through the change of the communication mode, the control device may activate or deactivate communication between the control device and a terminal in the first area. For example, when it is determined that no movable object is located in the first area, the control device may set the communication mode to be an inactive mode. Accordingly, the control device and the terminal do not communicate with each other, and thus user authentication or processing corresponding to a user authentication result may not be performed. As an example, when a user is located in the second area rather than in the first area or is located in other areas, the communication mode of the control device may be set to be an inactive mode, and thus the control device and the user's terminal may not communicate.

Also, when it is determined that there is a movable object in the first area, the control device may set the communication mode to be an active mode. Therefore, the control device and the terminal may communicate with each other, and user authentication or processing corresponding to a user authentication result may be performed when the control device receives a user authentication request from the terminal. As an example, when a user is located in the first area and the communication mode of the control device is set to be an active mode, the control device and the user's terminal may communicate.

As another example, when it is determined that there is a movable object in the first area, the control device may set the communication mode to be a first-area active mode in which the control device can communicate with a terminal present in the first area. Accordingly, the control device may communicate with the terminal present in the first area, and user authentication or processing corresponding to a user authentication result may also be performed. In this case, in some embodiments, the control device may communicate with another terminal present in the second area. For example, in the first-area active mode, the control device may activate both of a first communication unit that communicates with a terminal present in the first area and a second communication unit that communicates with a terminal present in the second area.

Also, when it is not determined that there is a movable object in the first area, the control device may set the communication mode to be a first-area inactive mode capable of not communicating with the terminal present in the first area but communicating with a terminal present in the second area. Accordingly, the control device may communicate with the terminal present in the second area rather than communicating with the terminal present in the first area. As an example, when a terminal is located in the second area, the control device may acquire information necessary for user authentication from the terminal, and thus the user authentication may be performed by the control device or the server. However, when a processing request corresponding to a user authentication result is set to be acquired by the control device when a terminal is located in the first area, the processing request corresponding to the user authentication result cannot be acquired when the terminal is located in the second area, and thus processing corresponding to the user authentication result may not be performed.

As another example, when it is determined that no movable object is located in the first area, the control device may set the communication module to a receiving mode. Thus, when a terminal is not located in the first area, the control device may receive information from the terminal but may not transmit information to the terminal. In some cases, the control device may communicate with a server.

However, even when the control device is in the receiving mode, the control device may transmit, to a terminal, information necessary to establish or maintain communication with the terminal but may not transmit other information (e.g., information having a data size greater than or equal to a predetermined size, information necessary for user authentication, information regarding a user authentication result, etc.) to the terminal. Also, in some cases, the control device may transmit specific information to the terminal if necessary even when the control device is in the receiving mode. For example, when specific information to be transmitted to a terminal is received from a server, the control device may transmit the corresponding information to the terminal.

Also, when it is determined that there is a movable object in the first area, the control device may set the communication mode to be a transceiving mode. Thus, the control device may transmit or receive information to or from the terminal. For example, in the case of the transceiving mode, the control device may transmit a user authentication result or a result of processing a user authentication result to the terminal.

Also, in another embodiment, when the control device and the terminal perform Bluetooth or BLE communication or other wireless communication, the control device may include a central mode or a peripheral mode as a communication mode through a change of the communication mode.

When the control device is in the central mode, a terminal may transmit an advertising signal, and the control device may scan the advertising signal to establish communication between the control device and the terminal. In this case, the terminal may communicate in the peripheral mode.

Also, when the control device is in the peripheral mode, the control device may transmit an advertising signal, and the control device may scan the advertising signal to establish communication between the control device and the terminal. In this case, the terminal may communicate in the central mode. More specifically, when the terminal communicates only in the central mode, Bluetooth signal strength received from the terminal is a criterion for communication connection recognition, but the deviation of the corresponding signal strength may be quite large between terminal manufacturers or between terminals. That is, in this case, although the connection and data transfer between the control device and the terminal are fast, signal reception may be delayed, and signals may be received beyond a specific distance. Accordingly, a malfunction may occur, and thus it may be difficult to accurately control timing.

To solve this problem, the control device and the terminal may communicate while changing the communication mode to the central mode or the peripheral mode depending on the location of the terminal.

Also, the control device may communicate using a first communication unit and a second communication unit. For example, the first communication unit may communicate in the central mode, and the second communication unit may communicate in the peripheral mode. When it is determined that there is a movable object in the first area, the control device may activate the first communication unit to communicate with a terminal present in the first area. In this case, the control device according to an embodiment may activate the second communication unit. Accordingly, the control device may communicate with the terminal present in the first area while communicating with another terminal present in the second area. Also, when it is determined that no movable object is in the first area, the control device may not communicate with the terminal present in the first area by deactivating the first communication unit. It will be appreciated that, in this case, the second communication unit may be activated.

This will be described in detail with reference to FIG. 10.

Also, in operation S300, the control device may acquire information necessary for user authentication from the terminal. Here, the information necessary for user authentication may include user authentication request information, user-specific information (or a user's or a terminal's identification information, identification information necessary for payment processing (e.g., a user's card information, authentication information corresponding to card information, etc)), a user's biometric information, password information, etc.), and the like.

When the terminal is located in the first area close to the control device, the control device may confirm that the user of the terminal intends to request user authentication by acquiring information necessary for user authentication.

In another embodiment, the control device may acquire some of the information necessary for user authentication when the terminal is located in the second area and may acquire the remainder of the information necessary for user authentication to confirm the entirety of the information necessary for user authentication in the first area when the terminal is located in the first area. For example, when the control device and the terminal communicate via Bluetooth and the terminal is located in the second area, the control device may communicate in the peripheral mode, and the terminal may communicate in the central mode. In this case, the control device may acquire some of the information necessary for user authentication from the terminal. Subsequently, when the terminal is located in the first area, the operation modes of the terminal and the control device may be switched so that the control device may communicate in the central mode and the terminal may communicate in the peripheral mode. In this case, by acquiring the remainder of the information necessary for user authentication from the terminal, the control device may acquire the entirety of the information necessary for user authentication when the terminal is located in the second area. Thus, when the terminal is located in the first area close to the control device, the control device may confirm that the user of the terminal intends to request user authentication by acquiring the entirety of the information necessary for user authentication.

In another embodiment, when the terminal is located in the second area, the control device may acquire the entirety of the information necessary for user authentication. However, at this time, a user authentication result may not be acquired by the control device. Subsequently, when it is determined that the terminal is located in the first area, the control device may acquire a user authentication result using the previously acquired information necessary for user authentication.

Also, in operation S400, the control device may acquire a result of the user authentication on the basis of the information necessary for user authentication. In an embodiment, user authentication may be performed by the control device. In this case, the control device may compare information necessary for user authentication prestored in the control device and information necessary for user authentication acquired from the terminal in order to perform user authentication and acquire a result of the user authentication. Also, in another embodiment, when user authentication is performed by the server, the control device may transmit at least some of the information necessary for user authentication acquired from the terminal and information corresponding to the information necessary for user authentication acquired from the terminal in order for the server to perform the user authentication and may acquire a result of the user authentication from the server.

In another embodiment, when the terminal is located in the second area, the control device may acquire the information necessary for user authentication. However, the user authentication result may not be acquired until the operation mode of the control device is changed in operation S200. Also, when the operation mode of the control device is changed in operation S200, it may be confirmed that the user of the terminal intends to request user authentication, and thus no user authentication result may be acquired. Also, in this case, the control device may acquire information necessary for user authentication from the user terminal before the terminal is located in the first area and may acquire a user authentication result on the basis of the information necessary for user authentication acquired in advance from the terminal when the terminal is located in the first area. Thus, it is possible to more quickly acquire a user authentication result.

Also, the control device may transmit a user authentication result to the user terminal and perform processing corresponding to the user authentication result. For example, the control device may control a user's access to a specific area, control a user's payment processing, control a user's use of a specific device, or control the operation mode of a specific device depending on the user authentication result.

Figure 8:
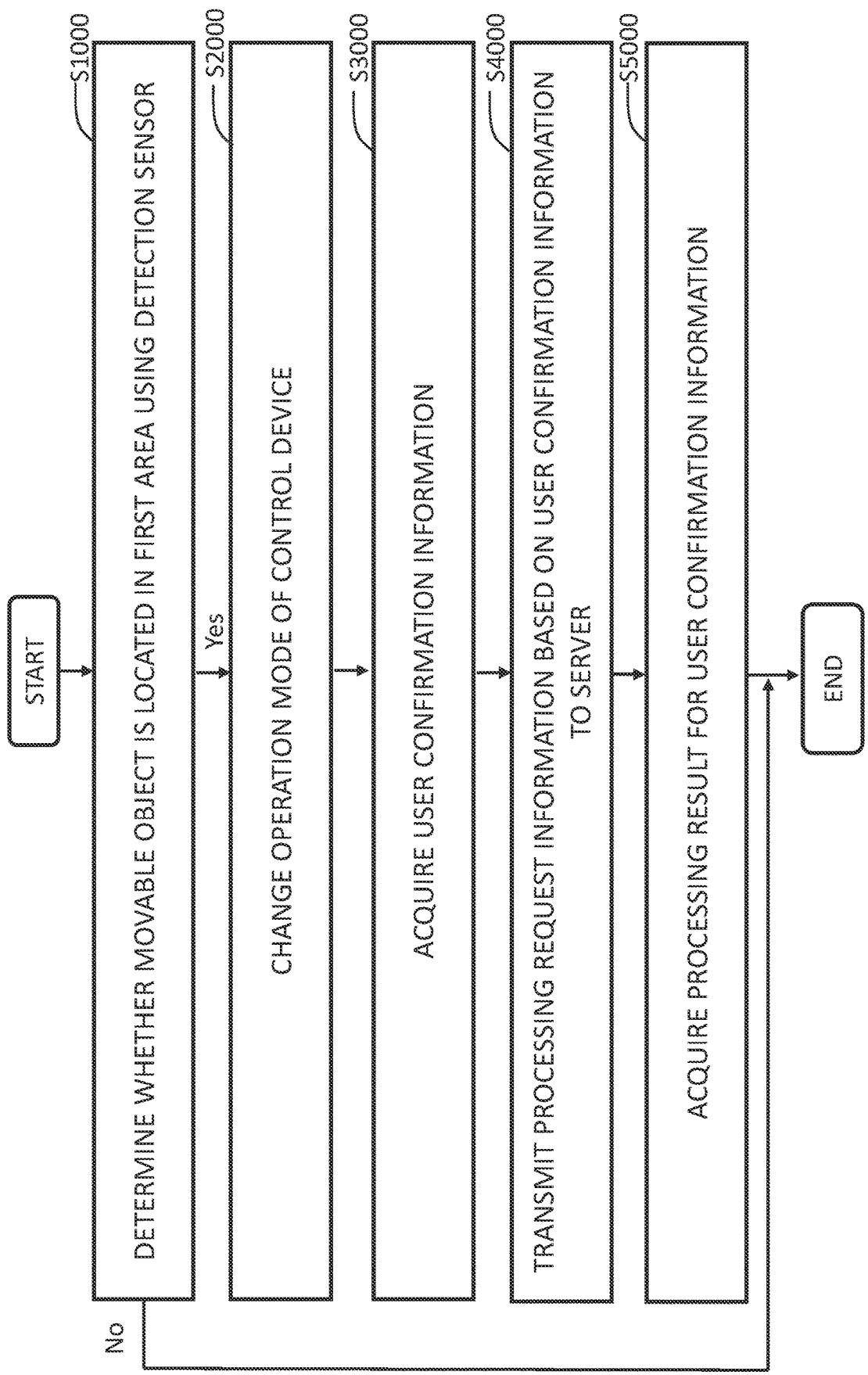
FIG. 8 is a flowchart illustrating a control method of a control device according to another embodiment.

FIG. 8 is a diagram illustrating the operation of a management system according to another embodiment.

Referring to FIG. 8, the control method of the control device may include determining whether a movable object is located in a first area using a detection sensor (S1000), changing an operation mode of the control device when it is determined that the movable object is located in the first area (S2000), acquiring user confirmation information (S3000), transmitting processing request information based on the user confirmation information to a server (S4000), and acquiring a processing result for the user confirmation information (S5000).

The above description in operations S100 and S200 of FIG. 7 can be applied to operations S1000 and S2000, and thus a detailed description thereof will be omitted.

In operation S300, the control device may acquire user confirmation information from a server or a terminal. Here, the user confirmation information may include a user authentication result. Specifically, the server may acquire information necessary for user authentication from the control device or the terminal. Also, the server may perform user authentication on the basis of the information necessary for user authentication, generate user confirmation information including a user authentication result, and transmit the generated user confirmation information to the terminal or the control device. When the user confirmation information is transmitted to the terminal, the terminal may transmit the user confirmation information to the control device.

Also, user authorization information (e.g., information on security areas that users can access, information on items for which users can process payment, information on devices that users can use, information on operation modes that users can control, etc.) may be included in the user confirmation information.

Also, in some embodiments, the user confirmation information may be generated in the form of a token. As an example, the user confirmation information may include at least one of user-specific information, user authorization information, validity conditions (a valid period, a valid area, etc.), issuer information, or recipient information.

In another embodiment, the user authentication result may not be included in the user confirmation information. In this case, the control device may confirm that the user is located in the first area on the basis of the user-specific information and may add confirmation result information to the user confirmation information.

Also, in operation S4000, the control device may transmit processing request information based on the user confirmation information to the server.

In an embodiment, when the user authentication result is included in the user confirmation information, the processing request information based on the user confirmation information may include a processing request for the user authentication result. Here, the processing for user authentication may refer to a subsequent operation to be performed based on the user authentication, such as controlling a user's access to a specific area, controlling a user's payment processing, controlling a user's using a specific device, or controlling the operation mode of a specific device depending on the user authentication result. Also, the processing request information based on the user confirmation information may include the user authentication result. The server may perform the processing for the user authentication result on the basis of the user authentication result according to the processing request information based on the user confirmation information.

Also, the processing request information based on the user confirmation information may include a request for determining whether to allow the control device to perform processing corresponding to the user authentication request result. In this case, the server may determine whether to allow the control device to perform processing for the user authentication request result on the basis of the user authentication result.

In another embodiment, the user authentication result is not included in the user confirmation information, and information for confirming that the terminal is in the first area may be included in the user confirmation information. Also, the processing request information based on the user confirmation information may include a user authentication request for performing user authentication on the basis user confirmation information. Also, the control device may transmit information necessary for user authentication to the server, and the server may perform user authentication on the basis of the information necessary for user authentication according to the user authentication request.

Also, in operation S5000, the control device may acquire a processing result for the user confirmation information. The processing result for the user confirmation information may vary depending on the processing request information based on the user confirmation information. For example, the processing result for the user confirmation information may include a result of processing the user authentication result, a result of determining whether to allow the control device to perform processing for the user authentication request result, a user authentication result, etc.

Figure 9:
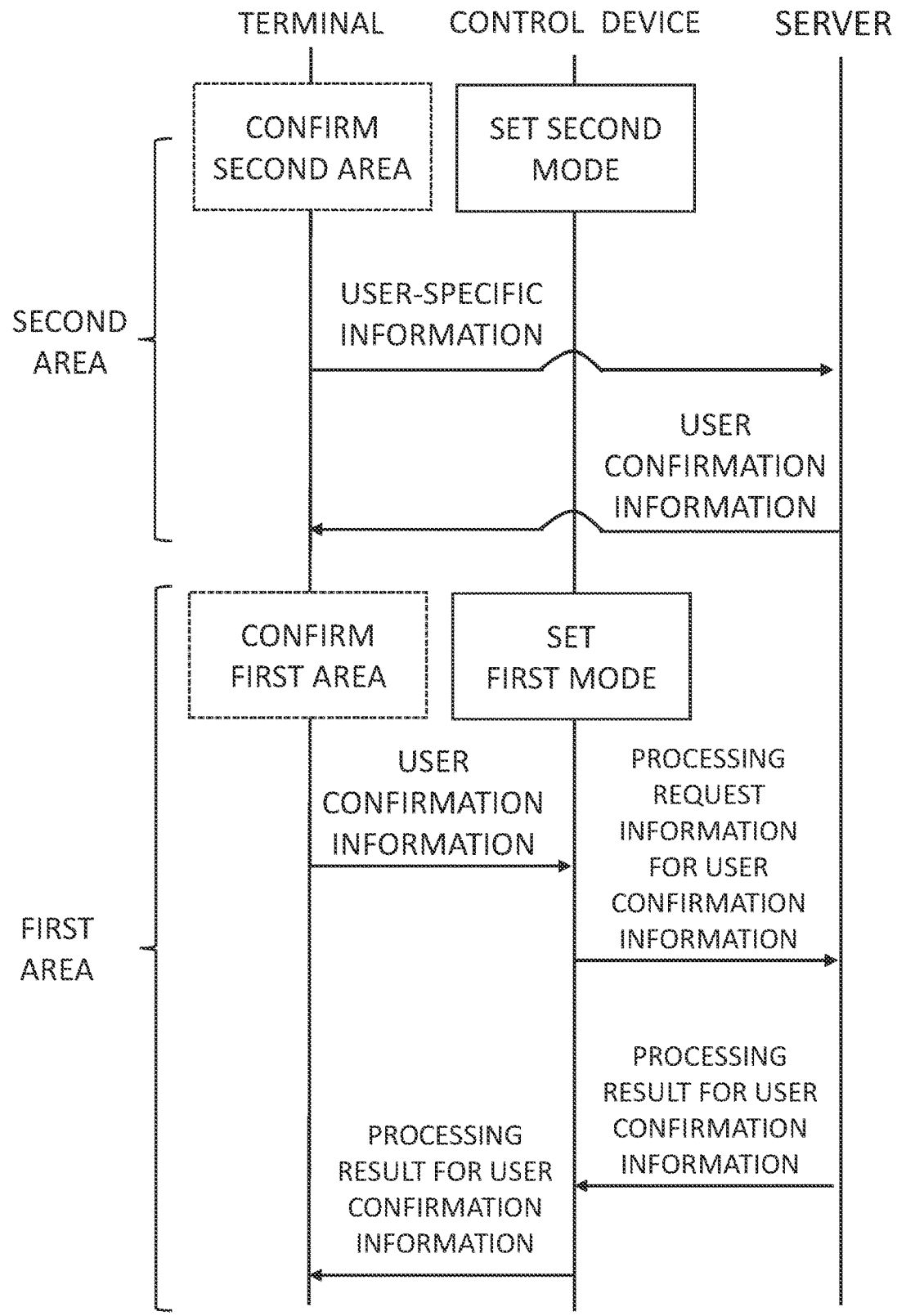
FIG. 9 is a sequence diagram illustrating the operation of a management system according to an embodiment.

FIG. 9 is a sequence diagram illustrating the operation of a management system according to an embodiment.

Referring to FIG. 9, when a terminal is located in a second area, a user of the terminal may not be located in a detection range of a detection sensor. Thus, the control device may activate a second mode. For example, the second mode may include one of the above-described inactive mode, a first-area inactive mode, receiving mode, and peripheral mode.

Also, the terminal may determine whether the terminal is located in the second area. For example, it is assumed that the control device is in the peripheral mode. When the terminal is located in a range in which an advertising signal of the control device can be received, the terminal may acquire the advertising signal from the control device, and the terminal may confirm that the terminal is located in the second area in response to acquiring the advertising signal. Also, as another example, the terminal may acquire a signal from a device capable of transmitting a signal to a first area rather than the control device and may confirm that the terminal is located in the second area when the signal is acquired. As another example, the terminal may include a global positioning system (GPS) sensor and may determine whether the terminal is located in the first area using the GPS sensor. Also, the terminal may acquire a user authentication request from a user through an input unit of the terminal and may determine that the terminal is located in the first area when the user authentication request is acquired from the user. As an example, an application for user authentication may be installed in the terminal, and the terminal may determine that the terminal is located in the first area when the application is executed by the user or when a user authentication request is input through the application.

However, when it is determined that the terminal is located in the second area, the terminal may transmit user-specific information to a server. Here, the user-specific information may refer to information for identifying a user to perform user authentication, such as a user's or a terminal's identification information (unique identifier (UID), device identifier (DID), etc.), identification information necessary for payment processing (e.g., a user's card information, authentication information corresponding to card information, etc.), and the like.

In this case, the terminal may transmit the user-specific information to the server directly or via the control device. For example, when a second mode of the control device is the inactive mode, the control device does not perform communication, and thus the terminal may transmit the user-specific information to the server directly.

As another example, when the operation mode of the control device, which is the second mode, is a first-area inactive mode, a receiving mode, or a peripheral mode, the control device may receive the user-specific information from the terminal and may transmit the user-specific information to the server.

The server may generate user confirmation information on the basis of the acquired user-specific information. The user confirmation information may include information for confirming that the user in the first area. Also, the user confirmation information may include a user authentication result and authorization information indicating that a user has specific authority. For example, the server may determine whether the user has specific authority using the user-specific information and user authorization information (e.g., information on security areas that users can access, information on devices that users can use, information on items for which users can process payment, information on operation modes that users can control, etc.). When a result of the determination is that the user has the specific authority, the server may generate user confirmation information. That is, user authentication may be performed by the server.

Also, the server may provide the user confirmation information to the terminal. As described above, the server may transmit the user confirmation information to the terminal directly or via the control device.

Also, when the terminal is located in the first area, a user of the terminal may be located in a detection range of a detection sensor, and thus the control device may activate a first mode. For example, the first mode may include one of the above-described active mode, first-area activation mode, transceiving mode, and peripheral mode.

Also, the terminal may determine whether the terminal is located in the first area. For example, the terminal may receive a signal indicating the first area from the control device or other devices and may confirm that the terminal is located in the first area in response to the corresponding signal. Also, the terminal may determine whether the terminal is located in the first area using the GPS sensor of the terminal. Also, the terminal may determine whether the terminal is located in the first area on the basis of an input from the user.

Also, when the terminal communicates via Bluetooth and the terminal is located in the second area, the control device may be set to be in the peripheral mode, the terminal may be set to be in the central mode, and a communication connection may be established therebetween. Subsequently, when the control device confirms that the terminal is located in the first area, the control device may be set to be in the central mode, and thus the previously established communication connection may be terminated. As the communication connection with the control device is terminated, the terminal may confirm that the terminal is located in the first area, and thus the operation mode may be set to the peripheral mode.

Also, in some embodiments, the terminal may not determine whether the terminal is located in the first area. In this case, in response to acquiring the user confirmation information, the terminal may broadcast the user confirmation information or transmit the user confirmation information to the control device to communicate with the control device. Also, when the terminal communicates via Bluetooth, the terminal may change the operation mode to the peripheral mode after the user confirmation information is acquired and thus may broadcast an advertising signal to communicate with the control device.

Also, the terminal may transmit the user confirmation to the control device. It will be appreciated that the terminal may transmit some of the user confirmation information or information obtained by processing the user confirmation information to the control device. However, for convenience of description, the following description will focus on the terminal transmitting user confirmation information to the control device. However, the present invention is not limited thereto.

The control device may acquire the user confirmation information from the terminal and may acquire the user authentication result.

In an embodiment, user authentication may be performed by the server. In this case, the control device may transmit the processing request information for the user confirmation information to the server. Here, the processing request information for the user confirmation information may refer to processing request information for the user authentication or the processing request information based on the user confirmation information. It will be appreciated that the control device may transmit only the user confirmation information to the server. However, for convenience of description, the following description will focus on the control device transmitting the processing request information for the user confirmation information to the server, but the present invention is not limited thereto.

The server may determine whether the processing request information for the user confirmation information acquired from the control device is valid. This may be to enhance security. For example, the user confirmation information may be included in the processing request information for the user confirmation information, and validity information may be included in the user confirmation information. The server may determine whether the user confirmation information acquired from the control device is valid on the basis of the validity information. As an example, the validity information may be generated by the server according to a predetermined rule when the server generates the user confirmation information. For example, the validity information may be a one-time password (OTP). The server may determine that the user confirmation information is valid using the predetermined rule.

As another example, the server may determine whether the user confirmation information acquired from the control device is identical to user confirmation information previously transmitted to the terminal and may determine that the user confirmation is valid when the two pieces of information are identical to each other. For example, the server may determine whether identification information of the user confirmation information included in the user confirmation information acquired from the control device is identical to identification information of the user confirmation information included in the user confirmation information transmitted to the terminal.

When it is determined that the processing request information for the user confirmation information is valid, the server may perform processing corresponding to the processing request information for the user confirmation information. Here, the processing corresponding to the processing request information for the user confirmation information may include the above-described processing corresponding to the user authentication result.

As an example, when the processing corresponding to the processing request information for the user confirmation information is payment processing, the payment processing may be performed by a payment module. Here, the payment module may be included in the server or other servers. In this case, identification information necessary for payment processing (e.g., a user's card information, authentication information corresponding to card information, etc.) is included in the processing request information for the user confirmation information, or identification information necessary for the payment processing may be prestored in the server. The server may provide the identification information necessary for the payment processing to the payment module. The payment module may perform authentication on the payment processing, and the server may acquire a result of the authentication on the payment processing from the payment module.

In another embodiment, when the processing request information for the user confirmation information includes a user authentication request, the server may perform user authentication by determining whether a user has specific authority. For example, user-specific information may be included in the processing request information for the user confirmation information, and the server may determine whether the user has specific authority using the user-specific information and user authorization information prestored in the server (e.g., information on security areas that users can access, information on items for which users can process payment, information on devices that users can use, information on operation modes that users can control, etc.) to perform user authentication.

The server may transmit the processing result for the user confirmation information to the control device, and the control device may perform an operation corresponding to the processing result for the user confirmation information and transmit the processing result for the user confirmation information to the terminal.

Also, in another embodiment, user authentication may be performed by the control device. Also, the control device may check whether the user confirmation information received from the terminal is generated by the server. This may be to enhance the security of user authentication. For example, validity information may be included in the user confirmation information received from the terminal, and the control device may determine whether the user confirmation information is valid on the basis of the validity information. The validity information may be generated by the server according to a predetermined rule when the server generates the user confirmation information. For example, the validity information may be an OTP. The control device may pre-acquire information on the predetermined rule from the server and may determine whether the user confirmation information is valid using the predetermined rule.

Also, the control device may perform user authentication by determining whether the user has specific authority. For example, user-specific information may be included in the user confirmation information, and the control device may determine whether the user has specific authority using the user-specific information and user authorization information prestored in the control device (e.g., information on security areas that users can access, information on devices that users can use, information on whether users can process payment, information on operation modes that users can control, etc.) to perform user authentication.

Also, when the specific authority is payment authority that allows the user to process payment, user authentication for the payment authority may be performed by the payment module. Here, the payment module may be included in the control device or other devices (e.g., the server, other servers, other payment devices, etc.). In this case, identification information necessary for payment processing (e.g., a user's card information, authentication information corresponding to card information, etc.) may be included in the user confirmation information or stored in the control device. The control device may provide the identification information necessary for the payment processing to the payment module. The payment module may perform the user authentication for the payment authority, and the control device may acquire a user authentication result for the payment authority from the payment module.

The control device may perform processing corresponding to the user authentication result and may transmit the user authentication result to the terminal.

Figure 10:
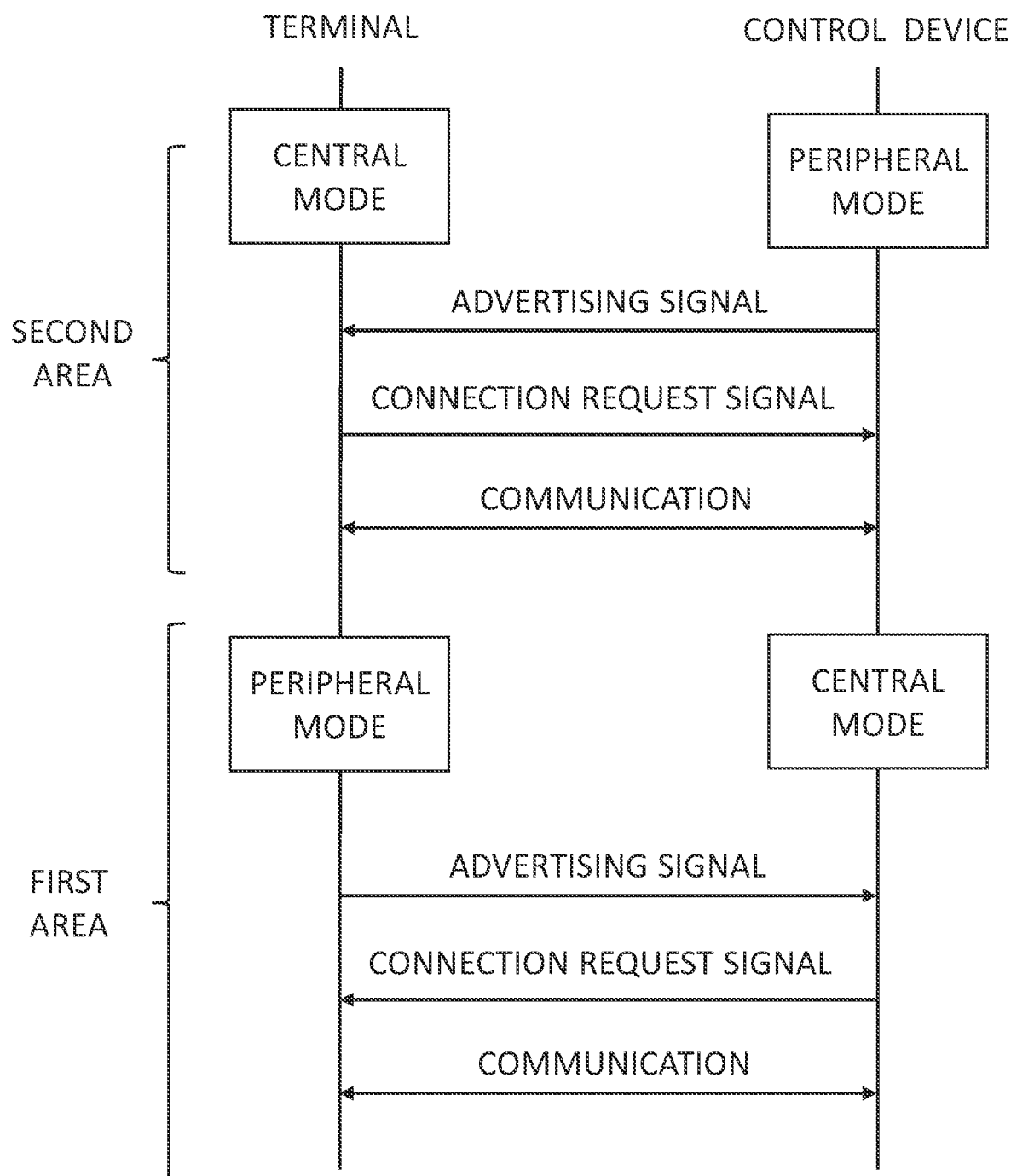
FIG. 10 is a sequence diagram illustrating the operation of a management system according to another embodiment.

FIG. 10 is a sequence diagram illustrating the operation of a management system according to another embodiment.

Referring to FIG. 10, a control device and a terminal may communicate in a wireless communication manner, such as via Bluetooth (or BLE). When the terminal is located in the second area, a user of the terminal may not be located in a detection range of a detection sensor. Thus, the operation mode of the control device may be set to the peripheral mode, and the operation mode of the terminal may be set to the central mode. Thus, the control device may broadcast an advertising signal. The terminal may perform a scanning operation to transmit a connection request signal to the control device. Subsequently, the control device and the terminal may recognize each other so that a communication connection can be established between the control device and the terminal.

Also, since the operation mode of the control device is the peripheral mode, no user authentication result may be acquired by the control device. However, the control device may acquire at least some of the information necessary for user authentication from the terminal. This may be to improve the speed of acquiring the user authentication result to be performed later.

Also, as another example, the control device may include the first communication unit and second communication unit which have been described above. Here, the first communication unit may operate in the central mode, and the second communication unit may operate in the peripheral mode. Accordingly, when it is determined that the user of the terminal is not located in the detection range of the detection sensor, the control device may drive the second communication unit without driving the first communication unit. Thus, the control device can communicate, through the second communication unit, with a terminal that is located in the second area and that operates in the central mode and cannot communicate with a terminal that is located in the first area and that operates in the peripheral mode.

Also, when the terminal is located in the first area and the user of the terminal is located in the detection range of the detection sensor, the operation mode of the control device may be set to the central mode, and the operation mode of the terminal may be set to the peripheral mode. That is, the operation modes of the control device and the terminal may be switched according to the location of the terminal.

As a specific example, the control device may terminate the previously established communication connection by changing the operation mode to the central mode. Thus, the terminal may confirm that the terminal is located at a first position and change the operation mode to the peripheral mode.

The terminal may broadcast an advertising signal, and the control device may perform a scanning operation to transmit a connection request signal to the control device. Subsequently, the control device and the terminal may recognize each other so that a communication connection can be established between the control device and the terminal.

Also, in an embodiment, the control device may determine whether the terminal with which communication is established when the control device is in the peripheral mode is identical to a terminal by which the advertising signal is received when the control device is in the central mode. For example, the control device may acquire the user's or the terminal's identification information (e.g., UID, DID, etc.) from the terminal when the control device is in the peripheral mode and may acquire the user's or the terminal's identification information from the terminal even when the control device is in the central mode. The control device may determine whether the two pieces of identification information of the user or terminal received at different times are identical and may establish a communication connection when the two pieces of information are identical and also the control device is in the central mode.

Also, as another example, when the user of the terminal is located in the detection range of the detection sensor, the control device may drive both of the first communication unit and second communication unit which have been described above.

Thus, the control device can communicate, through the second communication unit, with a terminal that is located in the second area and that operates in the central mode and can communicate, through the first communication unit, with a terminal that is located in the first area and that operates in the peripheral mode.

The description with reference to FIGS. 6 to 9 can be applied to the subsequent operations, and thus a detailed description thereof will be omitted.

Figure 11:
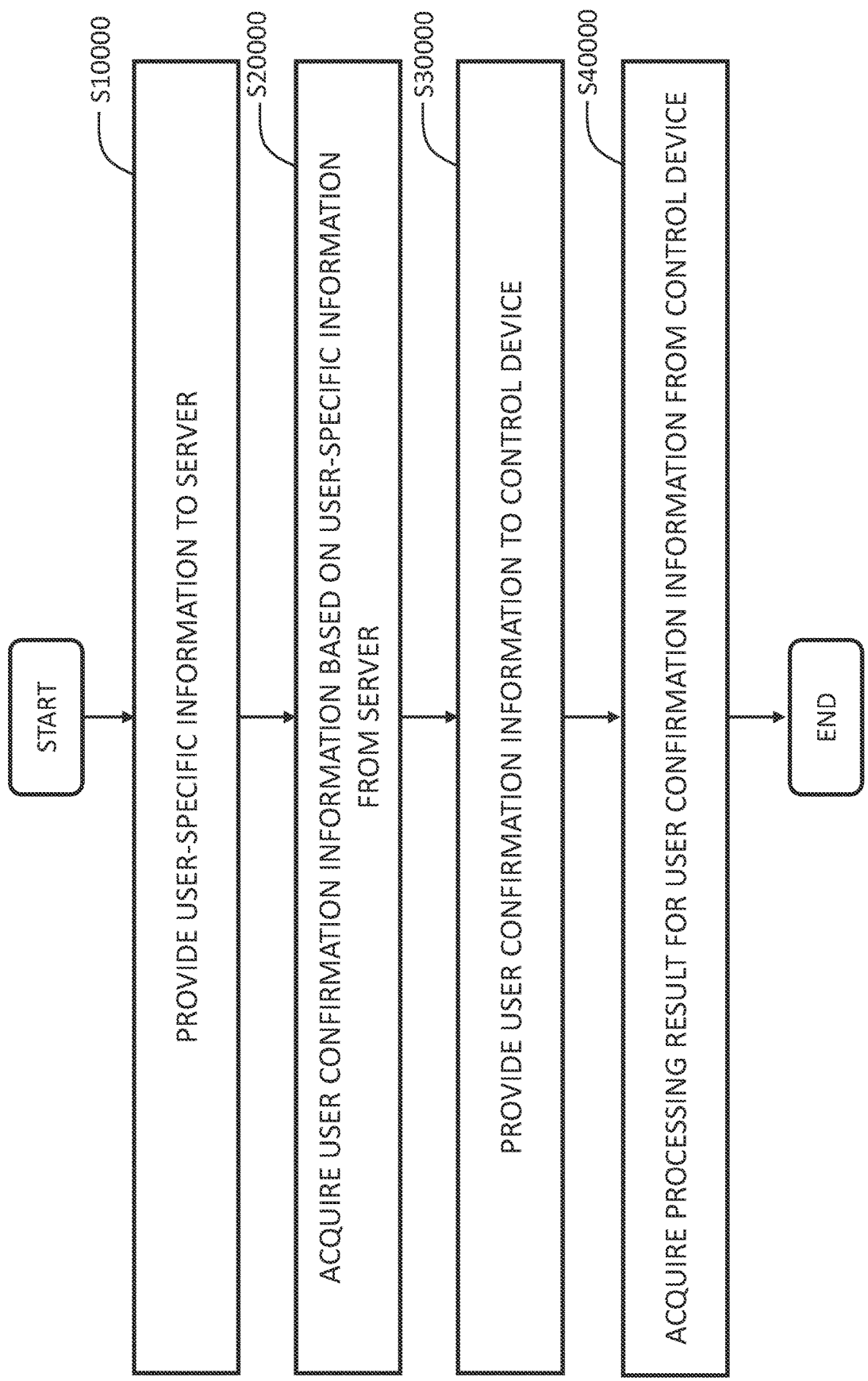
FIG. 11 is a flowchart illustrating a control method of a terminal according to an embodiment.

FIG. 11 is a flowchart illustrating a control method of a terminal according to an embodiment.

Referring to FIG. 11, the control method of the terminal may include providing user-specific information of the terminal to a server (S10000), acquiring user confirmation information based on the user-specific information from the server (S20000), providing the user confirmation information to a control device (S30000), and acquiring a result of processing the user confirmation information from the control device (S40000). The description with reference to FIGS. 6 to 10 can be applied to operations S10000 to S40000, and thus a detailed description thereof will be omitted.

According to the present disclosure, it is possible to enhance the accuracy and security of user authentication regardless of terminal performance.

Also, according to the present disclosure, it is possible to shorten the time taken for performing user authentication and processing corresponding to the user authentication.

Advantageous effects of the invention are not limited to the aforementioned effects, and other advantageous effects that are not described herein will be clearly understood by those skilled in the art from the following description and the accompanying drawings.

The various embodiments described above may be implemented as a software program including an instruction stored on machine-readable (e.g., computer-readable) storage media. The machine is a device which is capable of calling a stored instruction from the storage medium and operating according to the called instruction, and may include an electronic device according to the embodiments described above. When the instruction is executed by a processor, the processor may perform a function corresponding to the instruction directly or using other components under the control of the processor. The instruction may include a code which is generated or executed by a compiler or an interpreter. The machine-readable storage media may be provided in the form of non-transitory storage media. Herein, the term "non-transitory" only denotes that a storage medium does not include a signal but is tangible, and does not distinguish data semi-permanently stored in a storage medium from data temporarily stored in a storage medium.

According to an embodiment of the present disclosure, the method according to the various embodiments described above may be provided as being included in a computer program product. The computer program product may be traded as a product between a seller and a consumer. The computer program product may be distributed online in the form of machine-readable storage media (e.g., compact disc read only memory (CD-ROM)) or through an application store (e.g., Play Store™). As for online distribution, at least a part of the computer program product may be at least temporarily stored in a server of a manufacturer, a server of an application store, or a storage medium such as memory, or may be temporarily generated.

Although the present disclosure has been described with reference to specific embodiments and drawings, it will be appreciated that various modifications and changes can be made from the disclosure by those skilled in the art. For example, appropriate results may be achieved although the described techniques are performed in an order different from that described above and/or although the described components such as a system, a structure, a device, or a circuit are combined in a manner different from that described above and/or replaced or supplemented by other components or their equivalents.

Therefore, other implementations, embodiments, and equivalents are within the scope of the following claims.

What is claimed is:

1. A control method of a control device, the control method comprising:
   determining whether a movable object is located in a first area using a detection sensor;
   activating a first mode among operation modes of the control device when it is determined that the movable object is located in the first area;
   acquiring user confirmation information from a terminal when the first mode is activated, wherein the user confirmation information corresponds to user-specific information stored in the terminal and is provided to the terminal by a server before the terminal provides the user confirmation information to the control device;
   transmitting processing request information based on the user confirmation information to the server so that the server performs processing on the user confirmation information;
   acquiring a processing result for the user confirmation information from the server; and
   providing the processing result for the user confirmation information to the terminal,
   wherein the operation mode of the control device is activated as a second mode when it is not determined that the movable object is located in the first area,
   wherein when the first mode is activated, a communication area of the control device is set such that the communication area includes the first area and a second area indicating a predetermined communication area other than the first area, and
   wherein when the second mode is activated, the communication area of the control device is set such that the communication area includes the second area such that the control device communicates with a terminal in the second area without communicating with a terminal in the first area.

2. The control method of claim 1, wherein the first mode comprises an active mode in which the control device is allowed to communicate with a terminal located in the first area, and
   wherein the second mode comprises an inactive mode in which the control device is not allowed to communicate with a terminal located in the first area.

3. The control method of claim 1,
   wherein the control device comprises:
   a first communication unit configured to communicate with a terminal located in the first area; and
   a second communication unit configured to communicate with a terminal located in the second area, and wherein the control unit performs control to drive the first communication unit and the second communication unit when the first mode is activated, and wherein the control unit performs control to drive the second communication unit without driving the first communication unit when the second mode is activated.

4. The control method of claim 2, wherein the user-specific information comprises at least one of identification information of the terminal, identification information of a user of the terminal, or information necessary for user authentication.

5. The control method of claim 1, wherein the first mode comprises a central mode in which the control device receives an advertising signal from the terminal and scans the terminal in response to receiving the advertising signal, and wherein the second mode comprises a peripheral mode in which the control device transmits an advertising signal to the terminal and is scanned by the terminal in response to transmitting the advertising signal.

6. The control method of claim 3, wherein the first communication unit operates in a central mode in which the control device receives an advertising signal from the terminal and scans the terminal in response to receiving the advertising signal, and wherein the second communication unit operates in a peripheral mode in which the control device transmits an advertising signal to the terminal and is scanned by the terminal in response to transmitting the advertising signal.

7. The control method of claim 1, wherein the determining whether a movable object is located in a first area using a detection sensor comprises acquiring a detection signal from the detection sensor when the movable object is located in the first area and determining that the movable object is located in the first area when the detection signal is acquired.

8. The control method of claim 1, wherein the user confirmation information comprises a result for user authentication that is performed by the server based on the user-specific information, and wherein the processing request information based on the user confirmation information comprises a processing request for a result of the user authentication.

9. The control method of claim 1, wherein the user confirmation information comprises information for confirming that the terminal is in the first area, wherein the processing request information based on the user confirmation information comprises a user authentication request that requests the server to perform user authentication based on the user confirmation information, and wherein the processing result for the user confirmation information comprises a result of the user authentication.

10. A control method of a terminal, the control method comprising:

providing user-specific information of the terminal to a server;

acquiring user confirmation information based on the user-specific information from the server;

providing the user confirmation information to a control device, wherein the user confirmation information is received by the control device when the terminal is located in a first area and the control device confirms that a movable object is located in the first area through a detection sensor placed inside or near the control device; and acquiring a processing result for the user confirmation information from the control device when processing request information based on the user confirmation information is provided from the control device to the server so that processing of the user confirmation information is performed by the server, wherein the operation mode of the control device is activated as a first mode when it is determined that a movable object is located in the first area, wherein the operation mode of the control device is activated as a second mode when it is not determined that the movable object is located in the first area, wherein when the first mode is activated in the control device, the terminal communicates with the control device when the terminal is located in the first area or the terminal is located in the second area indicating a predetermined communication area other than the first area, and wherein when the second mode is activated in the control device, the terminal communicates with the control device when the terminal is located in the second area, and the terminal does not communicate with the control device when the terminal is located in the first area.

11. The control method of claim 10, wherein the providing of user-specific information of the terminal to a server comprises transmitting the user-specific information of the terminal from the control device to the server in the second area.

12. The control method of claim 10, wherein the providing of user-specific information of the terminal to a server comprises transmitting the user-specific information of the terminal to the control device so that the user-specific information of the terminal is transmitted to the server.

13. The control method of claim 11, wherein the providing of user-specific information of the terminal to a server comprises determining whether the terminal is located in the second area and providing the user-specific information of the terminal to the server when it is determined that the terminal is located in the second area.

14. The control method of claim 13, wherein the transmitting of the user-specific information of the terminal to the server comprises confirming a location of the terminal using at least one of a signal received from the control device, a signal received from an external device, or a signal acquired from a global positioning system (GPS) sensor included in the terminal and determining whether the terminal is located in the second area based on the confirmed location of the terminal.

15. A non-transitory computer-readable medium having recorded thereon a program for performing the method according to claim 1.

16. A non-transitory computer-readable medium having recorded thereon a program for performing the method according to claim 10.

* * * * *